US012645696B1

(12) United States Patent
Koyeti et al.

(10) Patent No.: US 12,645,696 B1
(45) Date of Patent: Jun. 2, 2026

(54) SYSTEM AND METHOD FOR SYNCHRONIZING LOCAL DATABASES AND DATABASE SERVER

(71) Applicant: Aeroseal LLC, Miamisburg, OH (US)

(72) Inventors: Sachin Kumar Koyeti, Dayton, OH (US); Niranjan Kode, Springboro, OH (US); John Frederic Blackwell, Beavercreek, OH (US); Eric James Levine, Dayton, OH (US); Ethan James Shepherd, Dayton, OH (US)

(73) Assignee: Aeroseal LLC, Miamisburg, OH (US)

( * ) Notice: Subject to any disclaimer, the term of this patent is extended or adjusted under 35 U.S.C. 154(b) by 0 days.

(21) Appl. No.: 18/967,998

(22) Filed: Dec. 4, 2024

(51) Int. Cl.
*G06F 16/00* (2019.01)
*G06F 16/23* (2019.01)
*G06F 16/27* (2019.01)

(52) U.S. Cl.
CPC .......... *G06F 16/27* (2019.01); *G06F 16/2358* (2019.01)

(58) Field of Classification Search
CPC ............................. G06F 16/27; G06F 16/2358
See application file for complete search history.

(56) References Cited

U.S. PATENT DOCUMENTS

| | | | | | |
|---|---|---|---|---|---|
| 7,606,881 | B2 * | 10/2009 | Chasman | ................ | G06F 16/27 |
| | | | | | 709/221 |
| 8,583,614 | B1 * | 11/2013 | Dilts | ...................... | G06F 16/27 |
| | | | | | 707/695 |
| 9,210,116 | B2 | 12/2015 | Yu-Lin et al. | | |
| 9,898,481 | B2 * | 2/2018 | Vibhor | ................ | G06F 11/1451 |
| 11,507,561 | B2 | 11/2022 | Nagey et al. | | |
| 2011/0302135 | A1 * | 12/2011 | Prophete | ................ | G06F 16/27 |
| | | | | | 707/634 |
| 2014/0258234 | A1 * | 9/2014 | Michels | ................ | G06F 16/273 |
| | | | | | 707/638 |

(Continued)

FOREIGN PATENT DOCUMENTS

| | | |
|---|---|---|
| CN | 113568921 A | 10/2021 |
| KR | 100637927 B1 | 10/2006 |

OTHER PUBLICATIONS

Dobility Inc, "Operating more fully offline (without the Internet)", Retrieved from internet URL: https://docs.surveycto.com/03-collecting-data/01-mobile-data-collection/04.fully-offline-operations.html on Nov. 4, 2024, 4 pages.

(Continued)

*Primary Examiner* — Alexander Khong

(57) ABSTRACT

The present disclosure discloses a system for database synchronization. The system receives update data on a first user device, determines connectivity parameters for local networks for the first user device, and identifies a second user device from the local devices based on the connectivity parameters. The update data is stored within a first database. The first user device operates in offline mode. The second user device is operating in an online mode. The system generates payload data comprising the update data encoded based on at least a first identifier associated with the first database, transmits the payload data to the second user device based on a local network from the local networks, causes the second user device to transmit the payload data to a remote database server, and causes the remote database server to synchronize a database associated with the user based on the payload data.

20 Claims, 8 Drawing Sheets

(56) References Cited

U.S. PATENT DOCUMENTS

2014/0280605 A1* 9/2014 Zhang ................. H04L 67/1095
                                                709/205
2017/0177686 A1* 6/2017 Biesemann ......... H04L 67/1095
2017/0177687 A1* 6/2017 Ritter ..................... G06F 16/27
2017/0177690 A1* 6/2017 Ritter ................. G06F 16/2365
2018/0234496 A1* 8/2018 Ratias ................... H04L 67/535
2018/0373729 A1* 12/2018 Mathurin .............. G06F 16/282
2019/0310972 A1* 10/2019 Nagey ................. G06F 16/2372
2024/0119042 A1* 4/2024 Gong ................... G06F 16/273

OTHER PUBLICATIONS

Dae-Myoung Lee et al., "An Implementation of Real Time Data Synchronization of Multiple Devices by Offline-first Strategy", Journal of the Korean Society of Embedded Engineering, vol. 13, Issue 6, Dec. 31, 2018, pp. 329-335.
Isak Shabani et al., "Solving Problems in Software Applications through Data Synchronization in Case of Absence of the Network", IJCSI International Journal of Computer Science Issues, vol. 9, Issue 1, Jan. 2012, pp. 10-16.
Anton Tyukov et al., "Automatic two way synchronization between server and multiple clients for HVAC system", iiWAS '11: Proceedings of the 13th International Conference on Information Integration and Web-based Applications and Services, Dec. 5, 2011, pp. 467-470.

* cited by examiner

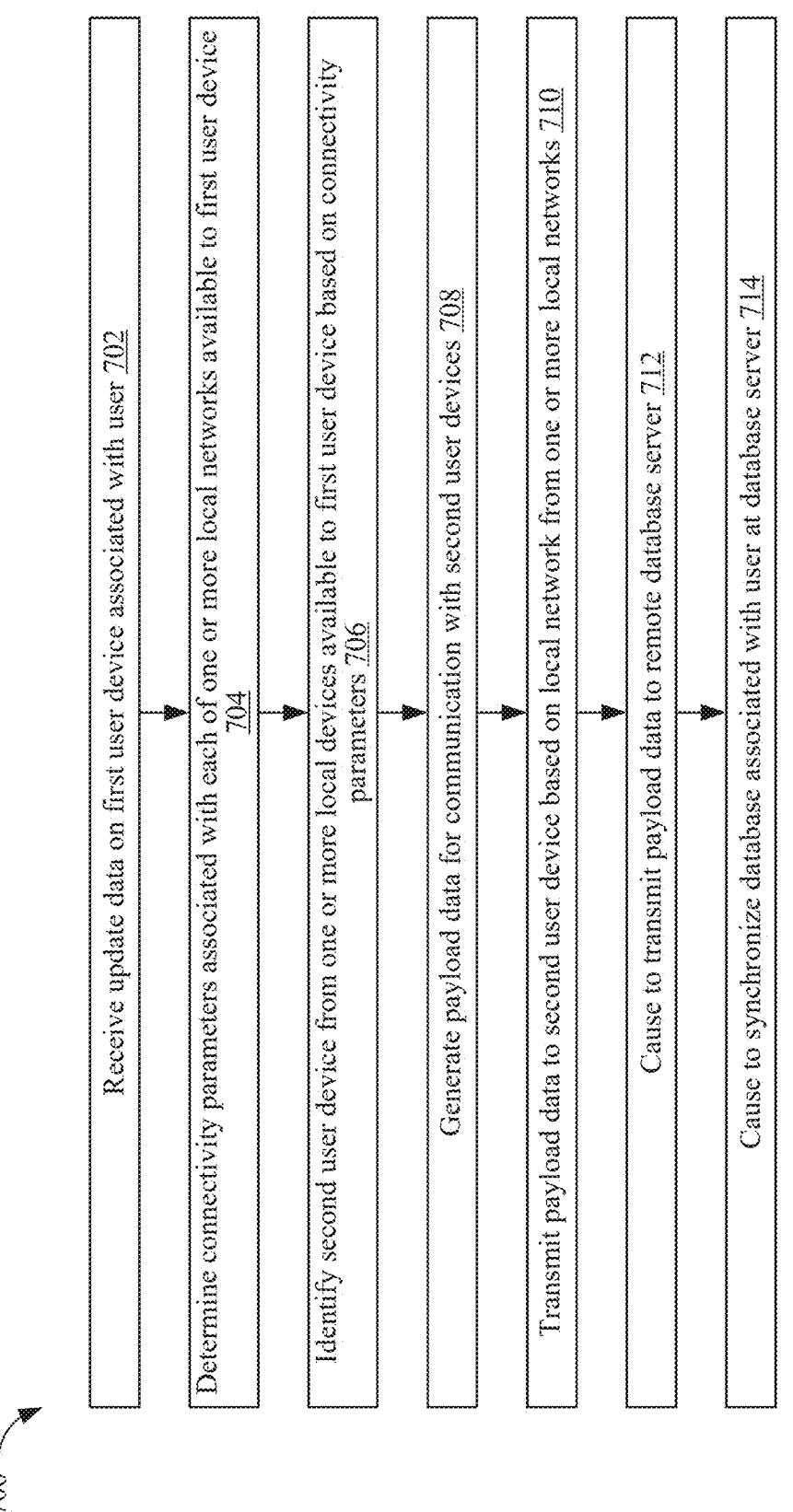

Receive update data on first user device associated with user 702

Determine connectivity parameters associated with each of one or more local networks available to first user device 704

Identify second user device from one or more local devices available to first user device based on connectivity parameters 706

Generate payload data for communication with second user devices 708

Transmit payload data to second user device based on local network from one or more local networks 710

Cause to transmit payload data to remote database server 712

Cause to synchronize database associated with user at database server 714

SYSTEM AND METHOD FOR SYNCHRONIZING LOCAL DATABASES AND DATABASE SERVER

TECHNOLOGICAL FIELD

The present disclosure generally relates to the field of database management, and more particularly relates to systems and methods for synchronizing the data between central database server and multiple local databases implemented on client devices.

BACKGROUND

Data synchronization is essential in information and technology (IT) solutions, particularly in the context of the Internet of Things (IoT) and mobile applications. It ensures that data remains consistent across various endpoints, including user devices, cloud services, and databases. As access to cloud-based data and mobile devices increases, the significance of data synchronization continues to grow.

With IoT devices becoming more integrated into business operations, the demand for efficient data synchronization has risen considerably. This process guarantees that data stays accurate and cohesive across multiple platforms and/or devices, facilitating consistency among different data sources. Also, IoT devices depend on data for fundamental operations. Therefore, it is crucial that updates to user-related information are both secure and continuous.

Thus, data synchronization is vital for maintaining data integrity and accuracy across IoT devices and other systems in today's business environment. It enables seamless data exchange and ensures that information remains current and secure, enhancing operational efficiency and informed decision-making. Usually, the synchronization of data is possible between a central server and a user device having a local database through an internet connection.

Existing synchronization methods primarily focus on synchronizing data between a single server and a single local database associated with a user device. With the changing landscape of device utilization, efficient synchronization across various devices, such as mobile devices and/or IoT devices becomes crucial Therefore, there is a need for efficient techniques for performing data synchronization across various databases as well as a central database server.

SUMMARY

The present disclosure provides a system and a method for synchronizing local databases with a remote database server. The present disclosure leverages multiple client devices associated with the same user to enable synchronization even when the primary device lacks an internet connection.

In one aspect, a system for database synchronization is provided. The system may include a memory configured to store computer executable instructions and one or more processors configured to execute the instructions to receive update data associated with a user on a first user device. The update data is stored within the first database local to the first user device. The first user device operates in an offline mode. The one or more processors are further configured to determine connectivity parameters associated with each of one or more local networks available to the first user device. The one or more local networks are established between the first user device and one or more local devices associated with the user. The one or more processors are further configured to identify a second user device from the one or more local devices available to the first user device based on the connectivity parameters. The second user device is operating in an online mode. The one or more processors are further configured to generate payload data for communication with the second user device. The payload data comprises the update data encoded based on at least a first identifier associated with the first database. The one or more processors are further configured to transmit the payload data to the second user device based on a local network from the one or more local networks. The local network is associated with the second user device. The one or more processors are further configured to cause the second user device to transmit the payload data to a remote database server. The one or more processors are further configured to cause the remote database server to synchronize a database associated with the user at the remote database server based on the payload data.

In an embodiment, the one or more processors are further configured to receive the update data from a user interface associated with the first user device. The one or more processors are further configured to generate a first instance of the first database based on the update data. The one or more processors may be further configured to update a one-way incremental counter associated with the first database based on the first instance of the first database. The update of the one-way incremental counter corresponds to an update of version information associated with the first database. The one or more processors may be further configured to trigger a synchronization of the first database with the database at the remote database server based on the update of the one-way incremental counter.

In an embodiment, the payload data comprises a header and a body. The header comprises updated version information, at least one table identifier associated with the update data, and the first identifier. The body comprises the update data.

In an embodiment, the one or more processors are further configured to receive database information associated with the first database. The database information indicates information associated with the update data stored within the first database. The one or more processors are further configured to identify the at least one table identifier associated with the update data based on the database information. The one or more processors are further configured to selectively add contents of the at least one table identifier within the body of the payload data based on the database information and the identification.

In an embodiment, the one or more processors are further configured to transmit connection data to at least one of the second user device or the remote database server, wherein the connection data comprises at least a first user device identifier associated with the first user device, the first identifier, and user information associated with the user. The one or more processors are further configured to receive connection acknowledgement from the remote database server in response to the transmitting. The connection acknowledgement comprises an encryption key. The one or more processors are further configured to encode the payload data based on the encryption key.

In an embodiment, the one or more processors are further configured to cause the remote database server to validate the payload data based on at least one of the encryption key, the first identifier, or the first user device identifier. The encryption key is privately held by the first user device and the remote database server. The one or more processors are further configured to cause the remote database server to synchronize the database associated with the user at the remote database server based on the payload data. The one or more processors are further configured to receive a synchronization acknowledgement from the remote database server based on the synchronization.

In an embodiment, the one or more processors are further configured to determine first user identifier data associated with the first user device. The one or more processors are further configured to determine second user identifier data associated with the second user device. The one or more processors are further configured to authenticate the second user device based on the first user identifier data and the second user identifier data. The one or more processors are further configured to transmit the payload data to the second user device based on the authentication.

In an embodiment, the one or more processors are further configured to transmit a first synchronization request to the remote database server. The first synchronization request is transmitted to the remote database server via the second user device. The one or more processors are further configured to receive change data from the second user device. The second user device receives the change data from the remote database server in response to the first synchronization request.

In an embodiment, the first user device allows for out-of-order reception of the change data.

In an embodiment, the one or more processors are further configured to transmit a second synchronization request to the remote database server. The second synchronization request is transmitted to the remote database server via the second user device. The one or more processors are further configured to receive acknowledgement data from the remote database server via the second user device in response to the transmitting of the second synchronization request. The acknowledgement data comprises last synchronization instance data. The one or more processors are further configured to generate the payload data based on the acknowledgement data.

In an embodiment, the one or more processors are further configured to determine connection data associated with a global network available for the first user device. The one or more processors may be further configured to determine the connectivity parameters associated with each of the one or more local networks available to the first user device in response to determining unavailability of the global network for the first user device.

In an embodiment, the one or more processors are further configured to transmit the payload data for synchronization to the remote database server through the global network in response to determining that availability of the global network for the first user device. The one or more processors may be further configured to cause the remote database server to synchronize the database associated with the user at the remote database server based on the payload data.

In an embodiment, each of the first database and the second database is a relational database, and the database server is a relational database server.

In another aspect, a method for database synchronization is provided. The method comprises receiving update data on a first user device associated with a user. The update data is stored within a first database local to the first user device. The first user device operates in an offline mode. The method further comprises determining connectivity parameters associated with each of one or more local networks available to the first user device. The one or more local networks are established between the first user device and one or more local devices associated with the user. The method further comprises identifying a second user device from the one or more local devices available to the first user device based on the connectivity parameters. The second user device is operating in an online mode. The method further comprises generating payload data for communication with the second user device. The payload data comprises the update data encoded based on at least a first identifier associated with the first database. The method further comprises transmitting the payload data to the second user device based on a local network from the one or more local networks. The local network is associated with the second user device. The method further comprises causing the second user device to transmit the payload data to a remote database server. The method further comprises causing the remote database server to synchronize a database associated with the user at the remote database server based on the payload data.

In an embodiment, the method further comprises receiving the update data from a user interface associated with the first user device. The method further comprises generating a first instance of the first database based on the update data, updating a one-way incremental counter associated with the first database based on the first instance of the first database, and triggering a synchronization of the first database with the database at the remote database server based on the update of the one-way incremental counter. The update of the one-way incremental counter corresponds to update of version information associated with the first database.

In an embodiment, the method further comprises receiving database information associated with the first database, identifying at least one table identifier associated with the update data based on the database information, and selectively adding contents of the at least one table identifier within the body of the payload data based on the database information and the identification. The database information indicates information associated with the update data stored within the first database.

In an embodiment, the method further comprises determining first user identifier data associated with the first user device. The method further comprises determining second user identifier data associated with the second user device. The method further comprises authenticating the second user device based on the first user identifier data and the second user identifier data. The method further comprises transmitting the payload data to the second user device based on the authentication.

In an embodiment, the method further comprises transmitting a first synchronization request to the remote database server. The first synchronization request is transmitted to the remote database server via the second user device. The method further comprises receiving change data from the second user device. The second user device receives the change data from the remote database server in response to the first synchronization request.

In an embodiment, the method further comprises transmitting a second synchronization request to the remote database server, receiving acknowledgement data from the remote database server via the second user device in response to the transmitting of the second synchronization request, and generating the payload data based on the acknowledgement data. The second synchronization request is transmitted to the remote database server via the second user device. The acknowledgement data comprises last synchronization instance data.

In yet another aspect, a computer programmable product comprising a non-transitory computer readable medium having stored thereon computer executable instructions for database synchronization, which when executed by one or more processors, cause the one or more processors to carry out operations. The operations may include receiving updated data on a first user device associated with a user. The update data is stored within the first database local to the first user device. The first user device operates in an offline mode. The operations may further include determining connectivity parameters associated with each of one or more local networks available to the first user device. The one or more local networks are established between the first user device and one or more local devices associated with the user. The operations may further include identifying a second user device from the one or more local devices available to the first user device based on the connectivity parameters. The second user device is operating in an online mode. The operations may further include generating payload data for communication with the second user device. The payload data comprises the update data encoded based on at least a first identifier associated with the first database. The operations may further include transmitting the payload data to the second user device based on a local network from the one or more local networks. The local network is associated with the second user device. The operations may further include causing the second user device to transmit the payload data to a remote database server. The operations may further include causing the remote database server to synchronize a database associated with the user at the remote database server based on the payload data.

BRIEF DESCRIPTION OF DRAWINGS

Figure 1A:
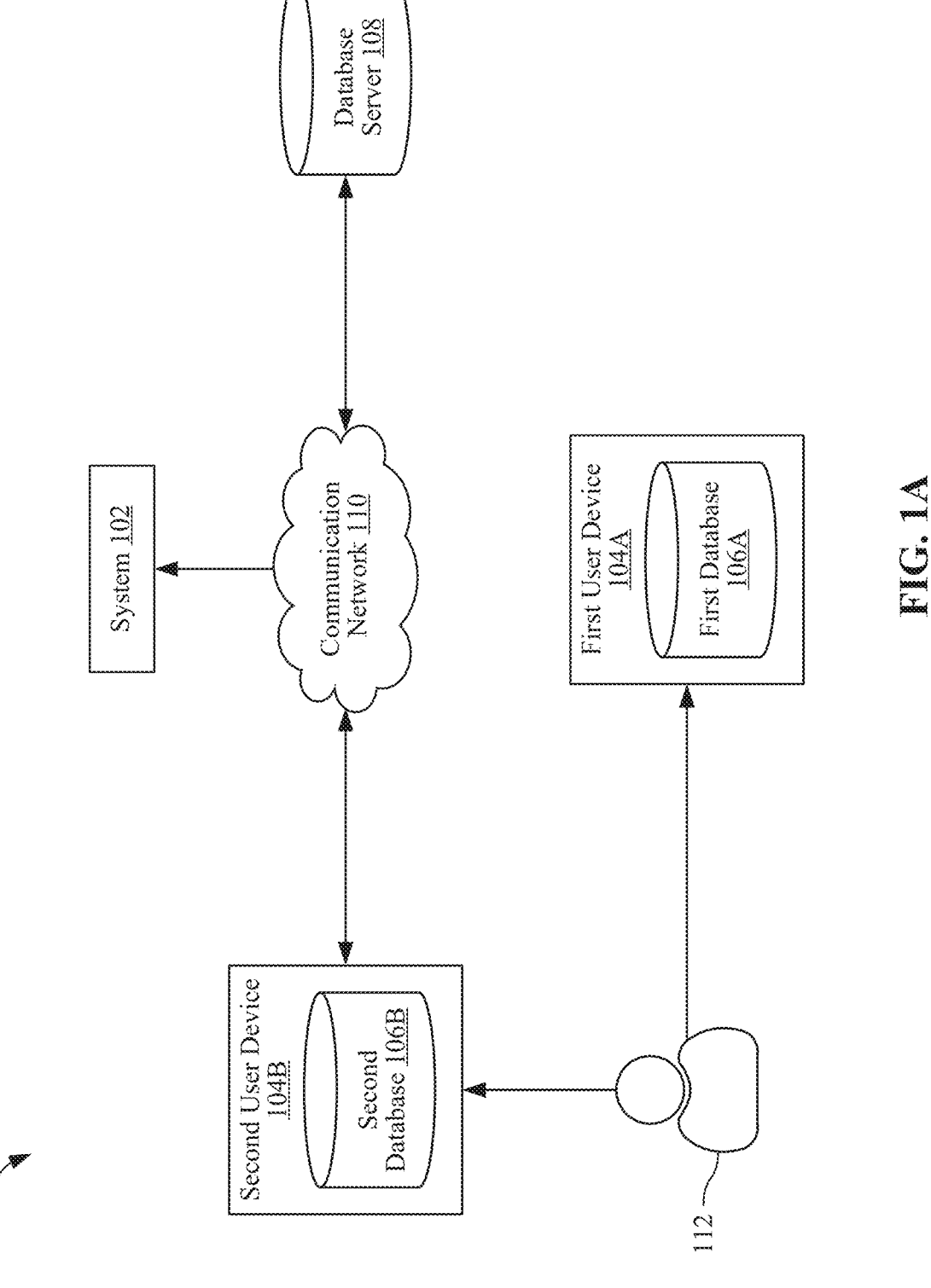
Figure 1B:
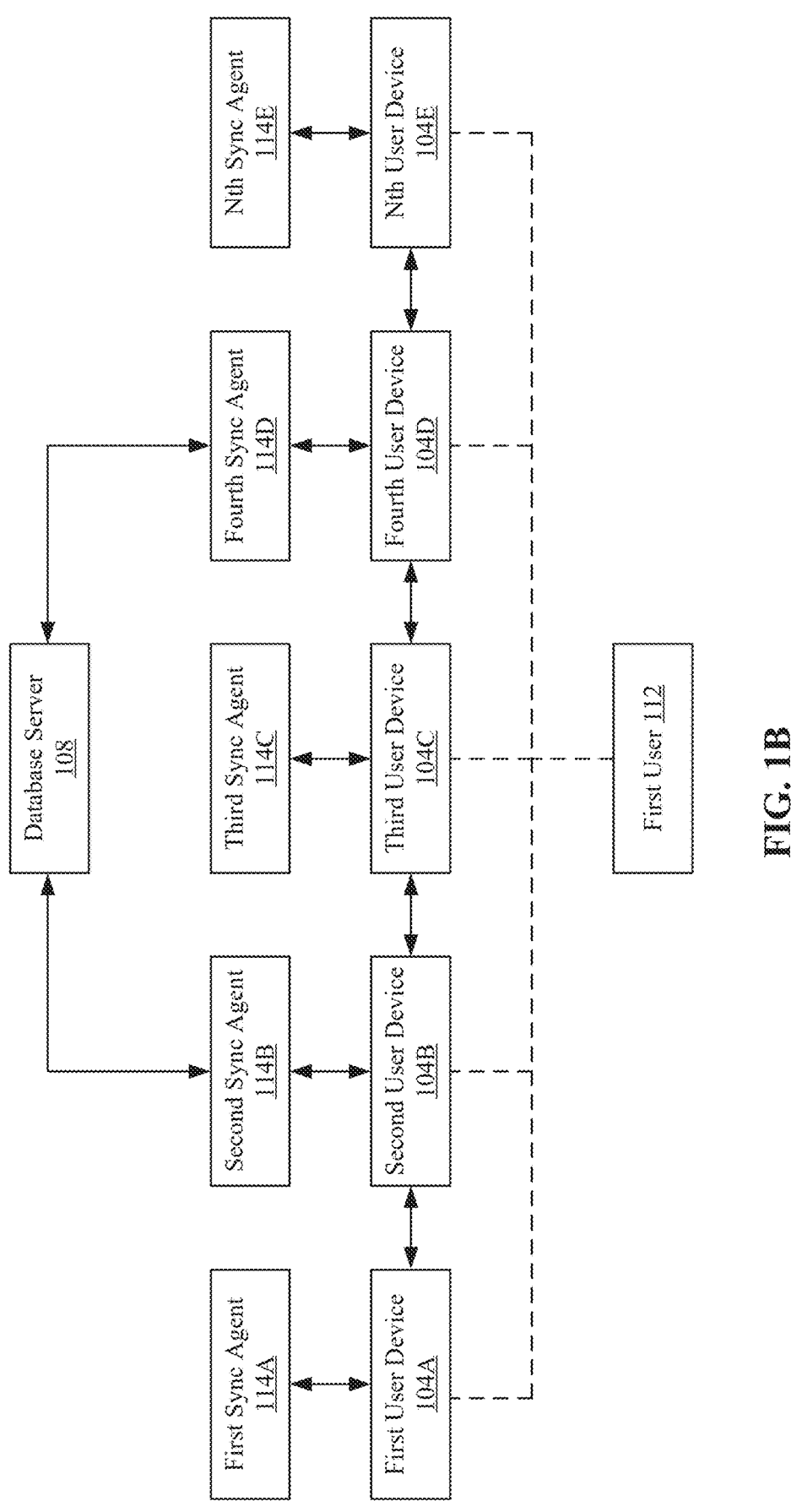
Figure 2:
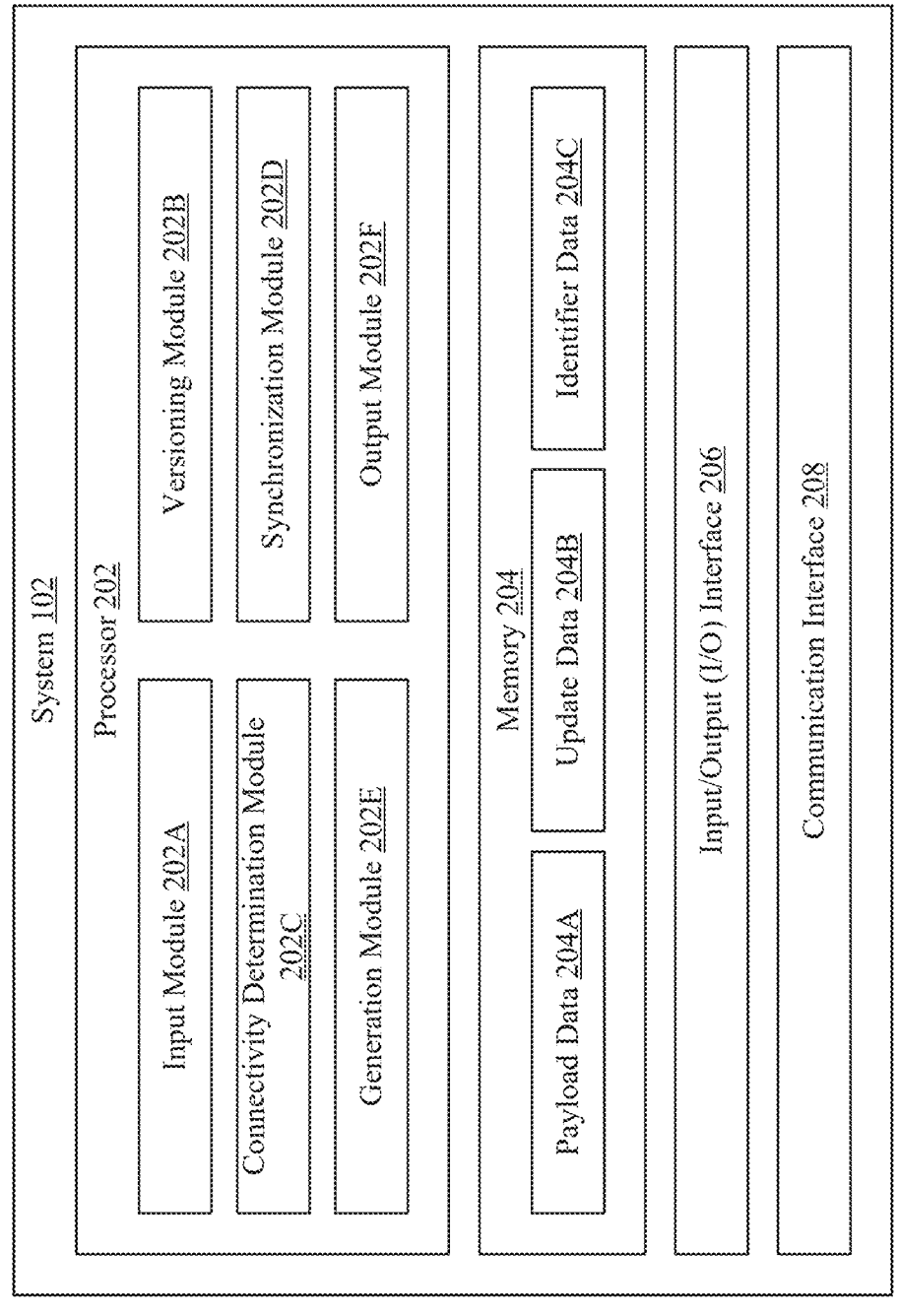
Figure 3:
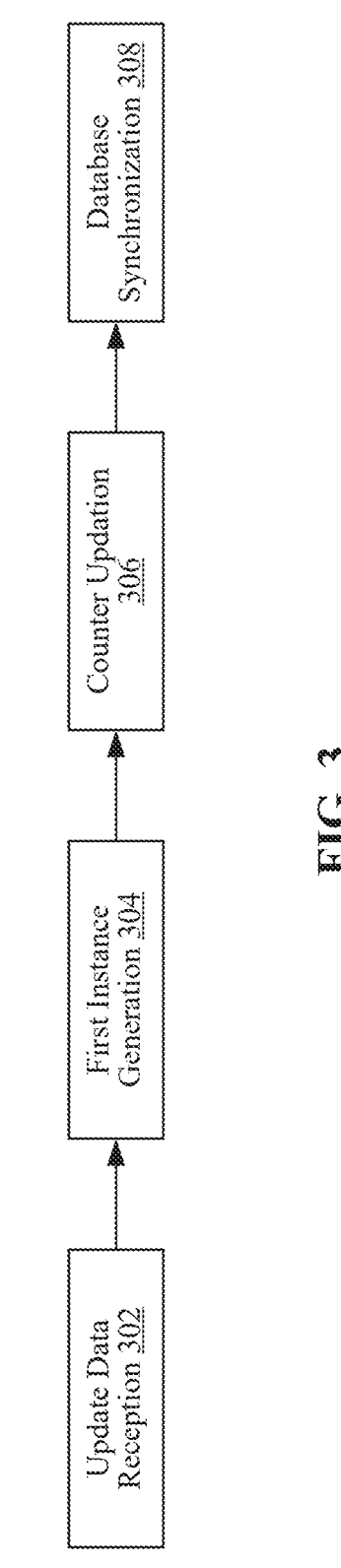
Figure 4:
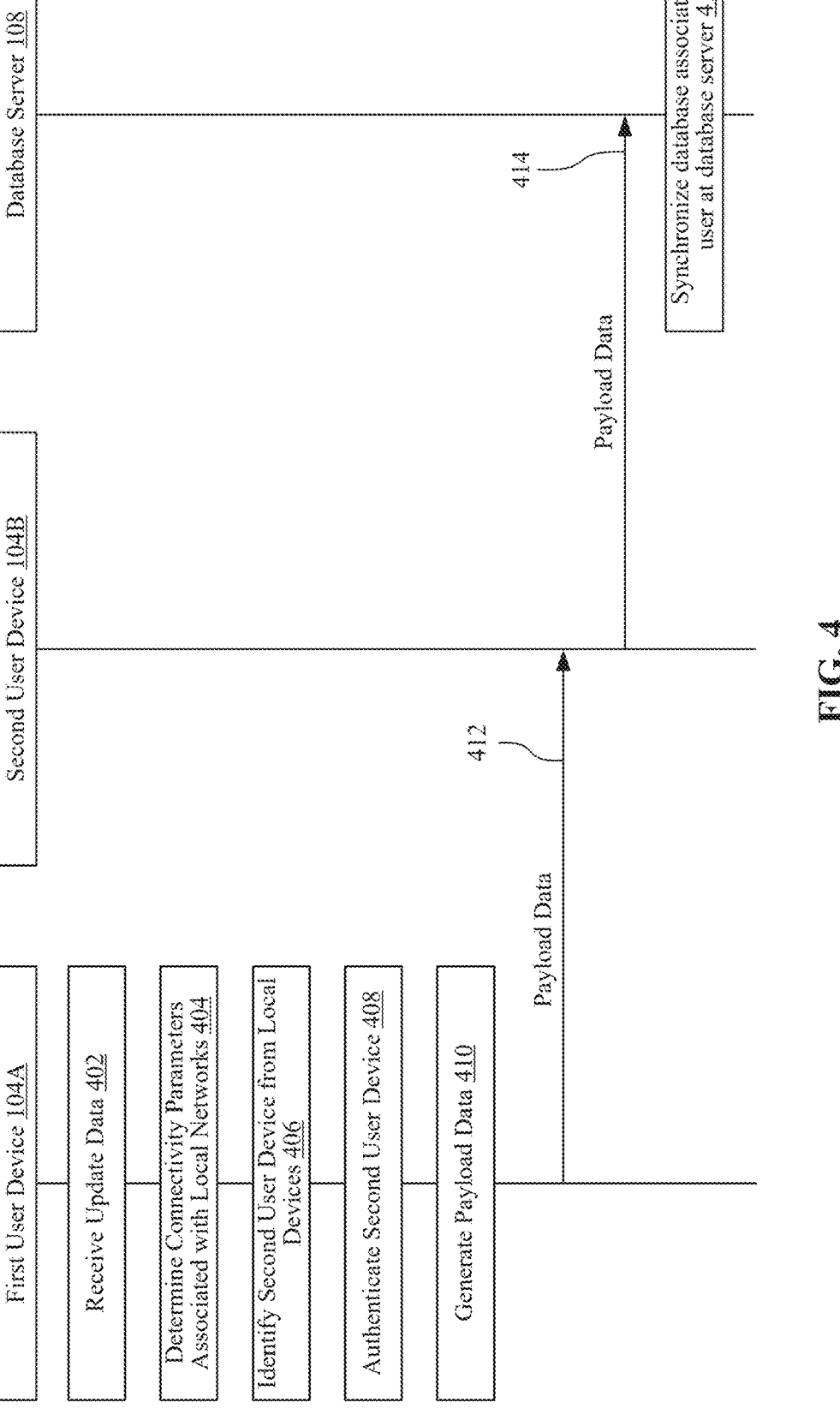
Figure 5:
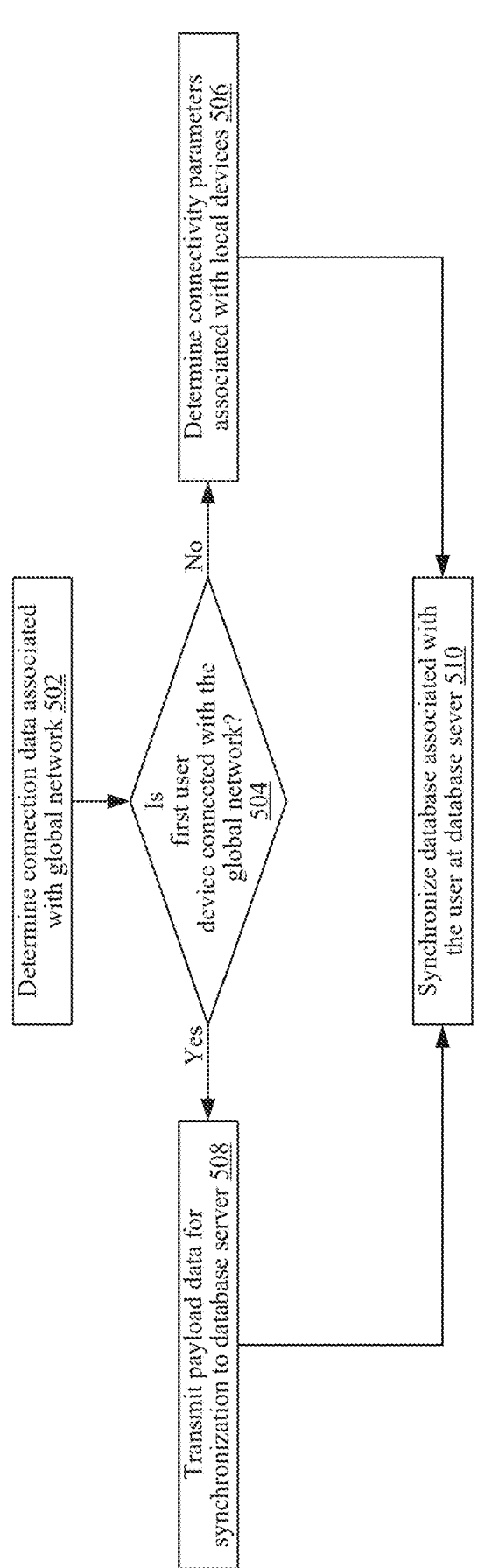
Figure 6:
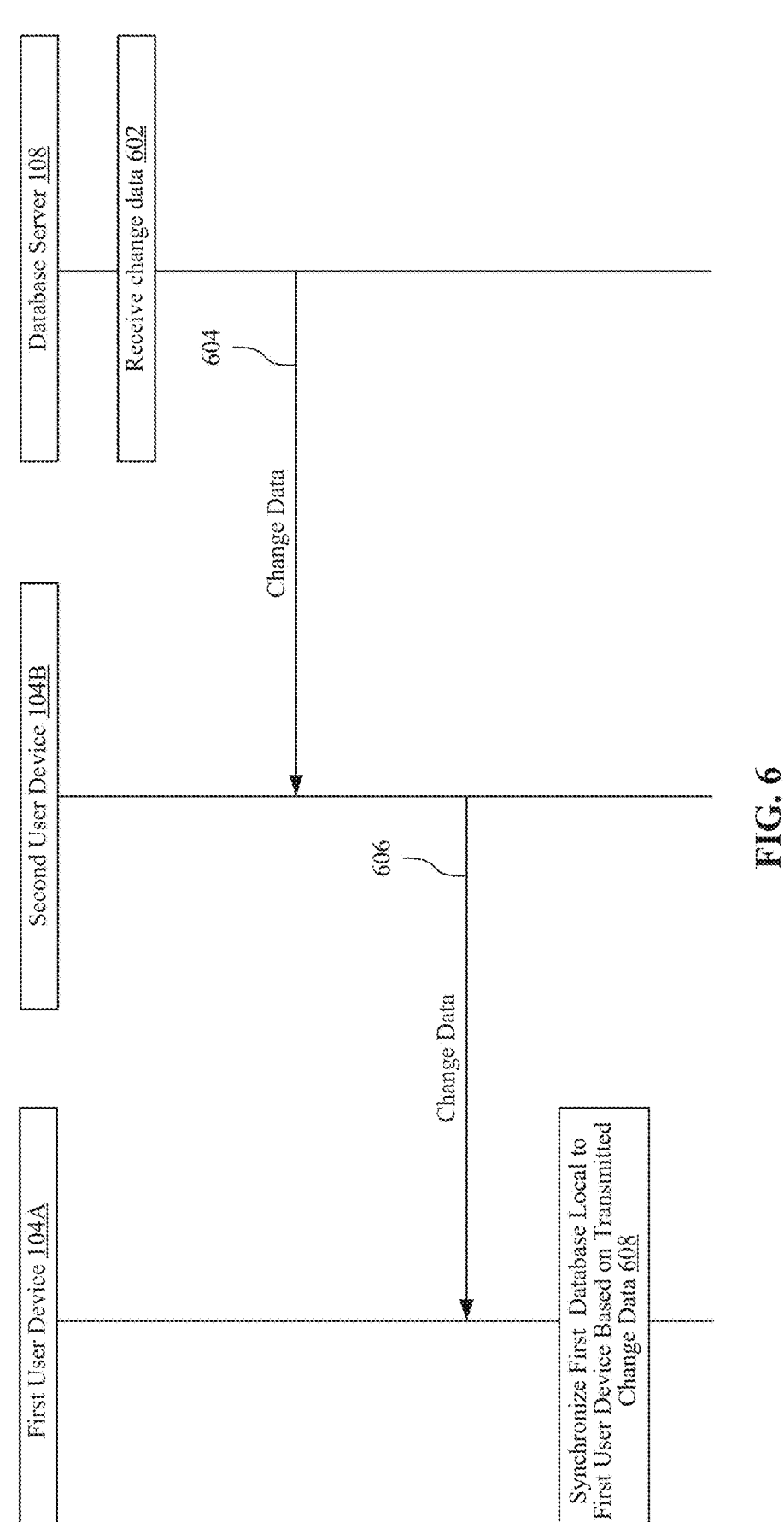

Having thus described example embodiments of the invention in general terms, reference will now be made to the accompanying drawings, which are not necessarily drawn to scale, and wherein:

FIG. 1A illustrates a network environment in which a system for synchronizing databases is implemented, in accordance with an example embodiment of the present disclosure;

FIG. 1B illustrates an example block diagram of a network environment associated with a user for database synchronization, in accordance with an example embodiment of the present disclosure;

FIG. 2 illustrates a block diagram of the system of FIG. 1A for synchronizing databases, in accordance with an example embodiment of the present disclosure;

FIG. 3 illustrates an exemplary block diagram for performing a versioning mechanism, in accordance with an example embodiment of the present disclosure;

FIG. 4 illustrates an exemplary sequence diagram for synchronizing databases between local devices associated with the user and a database server, in accordance with an example embodiment of the present disclosure;

FIG. 5 illustrates an exemplary flowchart of a method for synchronizing databases, in accordance with an example embodiment of the present disclosure;

FIG. 6 illustrates an exemplary sequence diagram for synchronizing databases between local devices, in accordance with an example embodiment of the present disclosure;

FIG. 7 illustrates a flowchart of an exemplary method for synchronizing databases, in accordance with an example embodiment of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification does not necessarily all refer to the same embodiment, nor are separate or alternative embodiments mutually exclusive of other embodiments. Further, the terms "a" and "an" herein do not denote a limitation of quantity but rather denote the presence of at least one of the referenced items. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received, and/or stored in accordance with embodiments of the present disclosure. Thus, the use of any such terms should not be taken to limit the spirit and scope of embodiments of the present disclosure.

As defined herein, a "computer-readable storage medium," which refers to a non-transitory physical storage medium (for example, a volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the description and should not be regarded as limiting. Any heading utilized within this description is for convenience only and has no legal or limiting effect.

FIG. 1A illustrates a network environment 100A in which a system 102 for synchronizing databases is implemented, in accordance with an example embodiment of the present disclosure. With reference to FIG. 1A, the network environment 100A includes the system 102, a first database 106A associated with a first user device 104A, a second database 106B associated with a second user device 104B, a database server 108, and a communication network 110. The first database 106A of the first user device 104A and the second database 106B of the second user device 104B are associated with a same user 112.

In an example, the first database 106A is associated with the first user device 104A. The first database 106A may be a database local to the first user device 104A. Further, the first user device 104A may correspond to a device from one or more local devices associated with or used by the user 112. Furthermore, each of the one or more local databases may include a local database to store corresponding local version of data. These local databases may be, for example, relational databases. The first user device 104A may be, but not limited to, a smartphone, tablet, laptop, or desktop computer.

The term database refers to a storage that organizes information in a way that helps users easily find data, recognize trends, and perform different tasks. Therefore, the first database 106A is defined as a system that regularly interacts with data, including activities like updating, reading, and changing information associated with the user 112. The data of the first database 106A may be modified based on, for example, interaction of the user 112 with the first user device 104A, other local devices associated with the user 112, or based on data received from server or any other central repository. Further, the first database 106A is a relational database.

Further, the second database 106B is associated with the second user device 104B. The second database 106B may correspond to one of the one or more local databases local to the second user device 104B associated with the user 112. Further, the second user device 104B may correspond to one of the one or more local devices associated with the user 112. The second user device 104B may be similar to the first user device 104A. In an exemplary embodiment, the second user device and the first user device are associated with the same user 112. Further, the second database 106B is a relational database.

The database synchronization orchestration is performed between a single local database and a cloud sever through an internet connection. Database synchronization orchestration between the local database and the cloud server involves the systematic coordination of processes to ensure data consistency across two environments.

In this synchronization workflow, database changes may occur. These database changes may arise due to, for example, updates, inserts, or deletes made by users in their local databases and/or changes at central server. For example, typical orchestration systems may monitor the local database and detect when a change occurs that needs to be propagated to the cloud server. Once a change is detected, the orchestration system prepares necessary data for synchronization. This includes identifying the specific records that have been modified and determining the type of operation (insert, update, delete). The orchestration system then establishes a secure connection to the cloud server over the internet and transmits the changes from the local database to the cloud server. Upon receiving the data, the cloud server applies these changes to its own copy or version of database. However, if any errors arise during the synchronization process such as those caused by network issues, the data may become corrupted. This corruption may lead to inconsistencies between the local and cloud databases, resulting in loss of data, application errors and unreliable access to information.

To overcome the aforementioned drawbacks associated with the database synchronization mechanisms, the present disclosure discloses the system 102 for synchronizing data between the remote database server 108 and one or more local devices associated with the user 112 even in conditions of infinite latency. The infinite latency refers to an indefinite delay in communication between one or more local devices and the central database server.

For example, a user has a laptop and a mobile phone, both configured with relational databases and connected to the central database server. If the mobile phone loses its internet connection, it goes offline, i.e., a state of infinite latency or latency greater than a predefined threshold. Any changes made to the relational database on the mobile phone during this offline period may be stored locally. Once the mobile phone reconnects to the internet, it may synchronize its changes with the central database server and potentially transmit those changes to other devices that are currently online, ensuring that all devices eventually have the latest data.

Although the present disclosure describes data synchronization between one or more local databases of the one or more local devices and the database of database server 108, however, this should not be construed as a limitation. In other example, the databases associated with local device of other users may also be synchronized with the same or different database of the central database server.

Thus, the present disclosure utilizes the system 102 for data synchronization between the database server and one or more local devices, designed to handle indefinite delays in communication, known as the infinite latency. This approach enhances the flexibility and reliability of database management across multiple user devices, particularly in environments with intermittent or limited internet connectivity.

The system 102 may include suitable logic, circuitry, interfaces, and/or code that may be configured to database sync orchestration. In an exemplary embodiment, the system 102 may be embodied as a cloud-based service, a cloud-based application, a cloud-based platform, a remote server-based service, a remote server-based application, a remote server-based platform, or a virtual computing system.

The communication network 110 may be wired, wireless, or any combination of wired and wireless communication networks, such as cellular, Wi-Fi, internet, local area networks, or the like. In some embodiments, the communication network 110 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

In an operation, the system 102 is configured to receive update data on the first user device 104A associated with the user 112. In an example, the update data may be received as a user input on a particular user interface displayed on the first user device 104A. The update data is stored within the first database 106A local to the first user device 104A. In an exemplary embodiment, the first user device 104A may be any user accessible device such as a mobile phone, a smartphone, a portable computer, a desktop, an IoT device, and the like. In an exemplary embodiment, the updated data may include various types of changes made by the user 112. In another exemplary embodiment, the changes may include an insertion, a deletion, or an update of a new record in the first database 106A. The user 112 may modify the existing records, and/or the user 112 may delete records from the local copy of the first database 104A at the first user device 104A to generate the update data.

Pursuant to embodiments of the present disclosure, the first user device 104A may be operating in an offline mode. Typically, offline mode refers to a mode in which the first user device 104A functions without requiring a connection to an external network (such as the internet, a cloud server, or a Local Area Network (LAN)). In the offline mode, the first user device 104A performs tasks using locally stored data, applications, or pre-downloaded resources. Certain features that rely on real-time data retrieval or communication with external systems may be unavailable or restricted, while the first user device 104A continues to operate autonomously with the information and capabilities stored locally. In other words, the first user device 104A may not be connected to a global network, such as the Internet and/or the LAN.

The system 102 may be further configured to determine connectivity parameters associated with each of one or more local networks available to the first user device 104A. The one or more local networks are established between the first user device 104A and the one or more local devices associated with the user 112. The one or more local devices refer to hardware or equipment that are directly connected to or part of a specific network, such as home or office network. In an example, the one or more local devices may include IoT devices, computers, smartphones, and other gadgets that communicate with each other within a same network. In another example, the IoT devices may be, for example, but not limited to smart thermostat, smart security cameras, and the like. In an exemplary embodiment, the system 102 is configured to scan all available local networks that the first user device 104A can connect to. These devices may be identified as local devices. For example, the second user device 104B may be a local device connected to the first user device 104A through a local network.

To this end, the available local networks may include Wi-Fi network, Ethernet connections and Bluetooth connections. For each identified local network, the system 102 may evaluate several network connectivity parameters, for example, but not limited to signal strength, latency, bandwidth, packet loss and network type associated with each local device.

Further, the system 102 is configured to identify the second user device 104B from the one or more local devices available to the first user device 104A based on the connectivity parameters. For example, the second user device is operating in an online mode. Specifically, the online mode refers to a mode in which a deice, such as the second user device is connected to an external network, such as the internet, cloud servers, or the Local Area Network (LAN). In the online mode, the second user device performs tasks using both real-time data retrieval and communication with external systems. Subsequently, the second user device may access remote servers, such as the remote database server 108 to synchronize data, or perform operations that require a live connection to external resources. The second user device may also utilize cloud-based services, external databases, and networked devices to enhance its functionality, providing access to the full range of features and services that are dependent on a network connection.

In an exemplary embodiment, if the first user device 104A is not connected with the internet and the second user device 104B is operating in online mode then a local connection, such as a direct WebSocket connection may be established between the first user device 104A and the second user device 104B. Specifically, a local network may be established between any two user devices associated with the user 112. Once the WebSocket connection is established, the first user device 104A may transmit the update data to the second user device 104B using the WebSocket protocol. The update data is sent directly from the first user device 104A to the second user device 104B without passing through an internet.

In particular, once the connectivity parameters have been determined, the system 102 is configured to identify the second user device 104B from the available one or more local devices based on the connectivity parameters. The second user device 104B is operating in an online mode. In an example, the system 102 assesses the connectivity parameters of each local device to determine which ones are operating in an online mode. Based on the evaluation, the system 102 identifies the most suitable second user device 104B that meets the criteria for online operation.

Thereafter, the system 102 is configured to generate payload data for communication with the second user device 104B. In an exemplary embodiment, the second user device 104B may be any user accessible device such as an IoT device, mobile phone, smartphone, portable computer, and the like. The payload data may include the update data generated at the first user device 104A. For example, the update data may be encoded based on a first identifier associated with the first database 106A to generate the payload data. This update data may consist of changes such as insertion, update, or deletion of records in the first database 106A. The first identifier uniquely identifies the first database 106A local to the first user device 104A. Further, the encoding with the first identifier may ensure that the update data is only transmitted to local devices associated with the same user 112. For example, each of the local devices of the user 112 may be aware of other local devices and may have a key for decrypting payload received from the remote database server 108. Subsequently, the encryption of the update data based on the first identifier may ensure that such key available to the remote database server 108 is able to decrypt the payload data.

The system 102 is configured to transmit the payload data to the second user device 104B based on a local network from the one or more local networks. For example, the user 112 may insert new data or record into the first database 106A associated with the first user device 104A. The system 102 generates the payload data such that the payload data includes the new record that is encoded using a unique first identifier associated with the first database 106A. The first user device 104A sends the payload data to the second user device 104B over a local network. In an example, the local network is a Wi-Fi network. For example, the transmission of the payload data from the first user device 104A operating in offline mode to the second user device operating in online mode may be performed this the Wi-Fi network to which the first user device 104A and the second user device 104B may be connected. For example, by forwarding WebSocket to the second user device 104B from the first user device 104A, the payload data may be transferred or transmitted.

Once the local network is selected, the system 102 prepares to establish a connection to the second user device 104B over the local network. The system 102 may be further configured to transmit the generated payload data to the second user device 104B based on the local network selected from the one or more local networks. Upon successful transmission of the payload data, the second user device 104B may send an acknowledgement back to the first user device 104A to confirm receipt of the payload data.

Further, the system 102 is configured to cause to transmit the payload to the remote database server 108 using the second user device 104B. Upon receiving the payload data, the second user device 104B may transmit the payload data to the remote database server 108. The remote database server 108 serves as a central repository for, for example, a database application that provides database services to other computer programs or to computers. Further, the remote database server 108 may be associated with at least the first database 106A of the first user device 104A.

In an example, the remote database server 108 may be a centralized server of an application, such as a messaging application. To this end, the user 112 may utilize the messaging application by installing the messaging application on at least the first user device 104A and the second user device 104B. In a scenario where the first user device 104A is operating in the offline mode, a message sent by the user 112 using the first user device 104A may not reach the remote database server 108 and thus may not be reflected on other devices either associated with the user 112 or another user (receiver) to whom the message is to be sent.

To this end, the system 102 of the present disclosure enables techniques to synchronize databases. In this regard, the update data generated by the user on the first user device 104A may be stored locally within the first database 106A. As the first user device 104A is not connected to the Internet, it may be unable to send the update data directly to the remote database server 108. To this end, the first user device 104A may scan for local networks. For example, the local network may be connections between the first user device 104A and other local devices. For example, these local devices may be connected to a same Wi-Fi network as the first user device 104A thereby forming local networks between the first user device 104A and the local devices. One such local device may be the second user device 104B.

In an example, the first user device 104A may identify the second user device 104B based on an active local network or local connection between the first user device 104A and the second user device 104B. Once identified, the first user device 104A may transmit the payload data comprising the message to the second user device 104B. Further, since the second user device 104B is operating in the online mode, i.e., connected to the Internet, the second user device 104B may transmit the payload data, i.e., the message, to the remote database server 108. Once the message reaches the remote database server 108, that may be associated with the messaging application, the message may be sent to user device associated with the receiver to whom the message is directed. A user device associated with the receiver may request for a payload data on the remote database server 108 and subsequently receive the update data. The user device may timely check for connectivity to the remote database server 108 and request for the payload data.

In an example, a number of devices may be connected to the Wi-Fi network to which the first user device 104A is connected. However, not all the devices connected to the Wi-Fi network may be associated with the user 112. Subsequently, to prevent interception of the message by devices that are not associated with the user 112, the payload data includes the update data encrypted based on the first identifier of the first database 106A of the first user device 104A. In certain cases, the update data may also be encrypted using additional identifiers as keys. These additional identifiers may be associated with the user 112, the first device 104A or any other entity associated with the user 112 and/or the first device 104A.

The system 102 may be configured to cause to synchronize a database associated with the user at the remote database server 108, based on the payload data. In an embodiment, the system 102 synchronizes a database associated with a user at the remote database server 108 involves updating the database on the server 108 to reflect changes made in a synchronized second database 106B, i.e., the update data. This process ensures that all databases maintain consistency and that any updates, deletions, or insertions are accurately propagated to all databases/devices despite certain devices having limited or no connectivity.

FIG. 1B illustrates an example block diagram 100A of the network environment 100A associated with the user 112 for database synchronization, in accordance with an example embodiment of the present disclosure FIG. 1B is explained in conjunction with elements of FIG. 1A.

With reference to FIG. 1B, there is shown one or more local devices associated with the user 112 (referred to as the first user 112, hereinafter). The one or more local devices may include the first user device 104A, the second user device 104B, a third user device 104C, a fourth user device 104D and an Nth user device 104E (collectively referred to as the user devices 104). Each of the user devices 104 may be equipped with its own synchronization agent (also referred to as a sync agent). Specifically, the first user device 104A is associated with a first sync agent 114A, the second user device 104B is associated with a second sync agent 114B, the third user device 104C is associated with a third sync agent 114C, a fourth user device 104D is associated with the fourth sync agent 114D, and the Nth user device 104E are associated with an Nth sync agent 114E. The first sync agent 114A, the second sync agent 114B, the third sync agent 114C, the fourth sync agent 114D and the Nth sync agent 114E may be collectively referred to as sync agents 114.

In an embodiment, the sync agents 114 located on the user devices 104 function as local synchronization engines. In an exemplary embodiment, the first user 112, using the first user device 104A, may provide update data that may be stored on the first database 106A. The update data may be transmitted to the second user device 104B via a local network. To this end, the example of the transfer of the update data to the second user device 104B from the first user device 104A is only exemplary and should not be construed as a limitation. In other examples, the update data may also be transmitted to other local devices associated with the user 112, such as the third user device 104C, the fourth user device 104D, etc. irrespective of a nature of connection of these used devices with the global network or the Internet. The second user device 104B may transmit the update data to the remote database server 108. In an example, the remote database server 108 may be a central database server or Structured Query Language (SQL) server, implying that it employs SQL as its primary language for managing and organizing data within relational databases, such as the first database 106A, the second database 106B, etc. In an exemplary embodiment, the first user 112 intends to modify existing data or add new information to the database hosted on the central database server. SQL is a programming language specifically designed for working with relational databases, allowing users to create, read, update, and delete data efficiently.

However, the first user device 104A, for example, mobile phone, IoT device, etc. may experience network latency or intermittent connectivity issues. In an example, the first user device 104A allows infinite latency, i.e., may be operating in offline mode and therefore may allow infinite latency. Infinite latency refers to a scenario where a data packet or a message never reaches its intended destination, such as the first user device 104A. In this case, the delay in transmission is so long (effectively infinite) that the packet is considered lost or unreachable. Such infinite latency may occur due to network failures at the first user device 104A, routing errors, or other severe issues in the communication path to the first user device 104A that prevent the packet from being delivered. When infinite latency happens, the data effectively never arrives, resulting in communication breakdown.

In such cases, the first sync agent 114A associated with the first user device 104A checks for other connected devices belonging to the first user 112 that are currently online and have internet access. After verifying internet connectivity associated other devices of the first user 112, the first sync agent 114A of the first user device 104A determines that the second user device 104B has stable internet connection. The first sync agent 114A associated with the first user device 104A sends the payload data to the second user device 104B, which has internet connectivity. The payload data comprises a header and a body. Further, the header serves as a metadata section of the payload data. It includes essential information about the data being sent, such as a device identifier for the first user device 104A. In an embodiment, each device associated with the first user 112 has its own unique device identifier, which helps to distinguish between different devices associated with the first user 112. For example, an identifier associated with a laptop associated with the user 112 may be related to its model number.

In an embodiment, the body of the payload data includes the update data that the first user 112 may have generated using the first user device 104A. The first user device 104A operating in offline mode may transfer the update data as a part of the payload data to the remote database server 108 via the second user device 104B. The update data is encoded based on at least a key associated with the user 112. The key associated with the user can be a unique identifier or a combination of attributes that uniquely identifies the user within the system 102. By encoding the update data with a user-specific key, the remote database server 108 may verify the authenticity of the payload data and ensure that the database at the remote database server 108 has not been tampered with. This process also allows the remote database server 108 to associate the update data or the payload data with the correct user, i.e., the user 112, facilitating proper data management and access control. Each of the first database 106A and the second database 106B is a relational database, for example, SQLite database.

Continuing further, the payload data is transmitted to the remote database server 108 used to update the database of the remote database server 108. The payload data may include modifications to existing information or new entries that need to be synchronized within the database of the remote database server 108. The second sync agent 114B of the second user device 104B may send the payload data to the remote database server 108 for synchronization.

In an exemplary embodiment, there may be multiple scenarios for updating local databases at the local devices 104 associated with the user 112.

In an example, the update data may be generated on a user device working in online mode, such as the second user device 104B. In such a case, the second sync agent 114B of the second user device 104B may transmit the update data directly to the remote database server 108 over the Internet. Subsequently the, the one or more local devices, such as the user devices 104 may also request for the update data associated with the first database of the first user device 104A. In this regard, sync agents 114 associated with each of the user devices 104 may synchronize corresponding local databases based on sending synchronization request to the remote database server 108 and receiving synchronization data comprising the update data from the remote database server 108. This may ensure that even when a user device, such as the first user device 104A of the user 112 is operating in offline mode, the first database 106A may still be updated. This may improve user experience.

In another example, the update data may be generated on a user device working in offline mode, such as the first user device 104A. In such a case, the first sync agent 114A of the first user device 104A may transmit the updated data as part of the payload data to other devices 104 via local networks or connections. In an example, the first sync agent 114A may transmit the update data or the payload data selectively to the second user device 104B that is connected to the Internet. In this regard, the second user device 104B may further transmit the payload data to the remote database server 108 that will further synchronize all other databases associated with the user devices 106 as well as other non-local devices on which such update data is to be reflected. In another example, the first sync agent 114A may transmit the update data or the payload data to all the local devices via local networks or connections to synchronize the database at the remote database server 108. In yet another example, the first sync agent 114A may transmit the update data or the payload data to at least one local device, such as the second user device 104B connected to the Internet.

It may be noted that the explanation of the present examples with respect to flow of information, i.e., the flow of the update data or the payload data, from the user devices 104 to the remote database server 108 is only exemplary and should not be construed as a limitation. In another implementation, the flow of information may be from the remote database server 108 to the user devices 104. The techniques of the present disclosure may also be utilized to synchronize databases of the user devices 104 based on an update received at the remote database server 108. In such a case, each of the user devices 106 may request for the change data from the remote database server 108. Further, the remote database server 108 may transmit such change data to the user devices 106 connected to the Internet, such as the second user device 104B. Thereafter, in certain cases, the second user device 104B may transmit the change data to user device(s) in local network, or selectively to local devices that are offline, such as the first user device 104A, in response to synchronization requests from the local devices or offline devices.

To this end, the sync agents 114 ensure that the updates made by the first user 112 and/or received by the first user 112 are propagated to and from the remote database server 108 to alternative devices when certain devices, such as first user device 104A experiences connectivity issues.

FIG. 2 illustrates a block diagram 200 of the system 102 for synchronizing databases, in accordance with an example embodiment of the present disclosure. FIG. 2 is explained in conjunction with elements of FIG. 1A and FIG. 1B.

The system 102 comprises a processor 202, a memory 204, an Input/Output (I/O) interface 206 and a communication interface 208. The processor 202 may be connected to the memory 204, the I/O interface 206, and the communication interface 208 through one or more wired or wireless connections. Further, the processor may include modules, such as an input module 202A, a versioning module 202B, a connectivity determination module 202C, a synchronization module 202D, a generation module 202E, and an output module 202F. Although in FIG. 2, it is shown that the system 102 includes the processor 202, the memory 204, the I/O interface 206, and the communication interface 208, however, the disclosure may not be so limiting and the system 102 may include fewer or more components to perform the same or other functions of the system 102.

In accordance with an embodiment, the system 102 may store data generated by the modules of the processor 202 in the memory 204. The data generated by the modules may include, for example, payload data 204A, update data 204B, and identifier data 204C. In an embodiment, the identifier data 204C may correspond to, for example, the first identifier data and second identifier data.

The system 102 may be configured to perform synchronization of databases. The processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application-specific integrated circuit), an FPGA (field programmable gate array), a microcontroller unit (MCU), a hardware accelerator, a special-purpose computer chip, or the like. As such, in some embodiments, the processor 202 may include one or more processing cores configured to perform independently. A multi-core processor may enable multiprocessing within a single physical package. Additionally, or alternatively, the processor 202 may include one or more processors configured in tandem via the bus to enable independent execution of instructions, pipelining, and/or multithreading. Additionally, or alternatively, the processor 202 may include one or more processors capable of processing large volumes of workloads and operations to provide support for big data analysis. In an example embodiment, the processor 202 may be in communication with the memory 206 via a bus for passing information among components of the system 102.

For example, when the processor 202 may be embodied as an executor of software instructions, the instructions may specifically configure the processor 202 to perform the algorithms and/or operations described herein when the instructions are executed. However, in some cases, the processor 202 may be a processor-specific device (for example, a mobile terminal or a fixed computing device) configured to employ an embodiment of the present disclosure by further configuration of the processor 202 by instructions for performing the algorithms and/or operations described herein. The processor 202 may include, among other things, a clock, an arithmetic logic unit (ALU), and logic gates configured to support the operation of the processor 204. The network environment, such as 100 may be accessed using the network interface 212 of the system 102. The network interface 212 may provide an interface for accessing various features and data stored in the system 102. In an example, the system 102 may be implemented locally of on each of one or more local devices of the user 112. In this regard, the system 102 may implement on a user device to implement a synchronization agent thereon. For example, the system 102 may be implemented on the first user device 104A to implement the first sync agent 114A thereon. Similarly, another instance of the system may be implemented on the second user device 104B to implement the second sync agent 114B thereon.

Pursuant to present example, the system 102 is considered to be deployed locally on the first user device 104A to implement the first sync agent 114A.

The input module 202A of the processor 202 may be configured to obtain the update data 204B. The input module 202A may receive the update data 204B from a user interface of the first user device 104A or the first database 106A local to the first user device 104A. In certain cases, the input module 202A may also receive payload data from, for example, the remote database server 108 over a global network or from one or more local devices over a local network.

The versioning module 202B may be configured to attach a version number to the first database 106A when a new version is created. Such new version may be created due to the input of the update data 204B on the first user device 104A. As the update data 204B is stored in the first database 106A, a new version is created. The versioning module 202B may identify such alteration to database metadata or schema due to the update data 204B as a new state of the first database 106A. Subsequently, the versioning module 202B may assign a unique version number, or a unique version name. In an example, the versioning module 202B may utilize a one-way incremental counter for versioning a change or update in the first database 106A. To this end, the change in the first database 106A due to the update data may trigger the versioning module 202B to update the one-way incremental counter from a first value, say 0, to a second value, say 1.

To this end, the versioning module 202B may utilize a versioning mechanism for managing and tracking changes to the first database schemas and data over time. Further, the versioning module 202B may transfer the update to the generation module 202E. Versioning module 202B keeps a detailed history of all modifications made to the database schema and associated data. This includes information on who made the change, when it was made, and the nature of the change.

The connectivity determination module 202C may be configured to determine the connectivity parameters of the each of one or more local networks. The connectivity parameters are determined for one or more local networks available to the first user device 104A. In an example, the connectivity parameters may be indicative of parameters of local network over which the first user device 104A may transmit data to any of the local devices. For example, the connectivity parameters may include data to enable the first user device 104A to establish a local connection with one or more of the one or more local devices over the corresponding local network. In an example, the connectivity parameters for a local network may indicate an available local connection over Wi-Fi network with a local device available to the first user device 104A, and another connectivity parameters for another local network may indicate an available local connection over Bluetooth network with a local device available to the first user device 104A.

In certain cases, the connectivity parameters also may be indicative of a type of connection each of the local devices may have. In an example, each of the one or more local devices will have some type of connection, like Internet connectivity, Wi-Fi, Bluetooth, etc. The connections available at each local device of the one or more local devices may be used to selectively identify local networks for beneficial transfer of data, say transfer of data only to device having Internet connectivity. The connectivity parameters may indicate how to connect to the local devices using the local network.

The synchronization module 202D may be a component or tool used to coordinate and manage the consistency of data across different systems, processes, or devices. In an embodiment, the synchronization module 202D may be configured to establish a connection between the first user device 104A and the one or more local devices available to the first user device 104A over the one or more local networks. In an example, the connection between the first user device 104A and the one or more local devices may be established using the WebSocket protocol.

Further, the generation module 202E may be configured to generate the payload data 204A based on the update data 204B. For example, the payload data 204A comprises a header and a body. The header of the payload data 204A may include updated version information, at least one table identifier associated with the update data, and the first identifier associated with the first user device 104A at which the payload data 204A is generated. Further, the body includes the update data 204B. For example, the update data 204B may be encoded based on the first identifier associated with the first database 106A. In an example, the update data is encoded based on at least a key associated with the user 112. The key may be privately held by the first user device 104A associated with the user 112 and the remote database server 108. Subsequently, any device, although available to the first user device 104A over local network but not associated with the user 112, may be unable to decrypt the payload data 204A. The security of the payload data 204A is also enhanced based on the encoding of the update data 204B based on the first identifier associated with the first database 106A, which is also known only amongst local devices associated with the user 112 and/or the remote database server 108.

It may be noted that not all devices associated with the user 112 may be accessible over the local network at a given time. Subsequently, the payload data 204A is only transmitted to local device(s) associated with the user 112 over the local network(s).

Once the payload data 204A is generated, the output module 202F may transmit the payload data 204A to local device(s) associated with the user 112 available over the local network(s). Upon successful transmission of the payload data 204A, the local device(s) associated with the user 112 may send an acknowledgement back to the first user device 104A to confirm the receipt of the payload data 204A. In an embodiment, the output module 202F may transmit the payload data 204A to the local device(s) using the local network established by the synchronization module 202D.

Thereafter, a system or sync agents 114 implementing locally on these local device(s) may be configured to transmit the payload data 204A to the remote database server 108. In certain cases, if a local device from the local device(s) is connected to the global network, i.e., the Internet, then the system or the synchronization module of the system at the local device may transmit the payload data 204A to the remote database server 108 to synchronize all possible/associated databases to indicate the update data 204B.

The memory 206 may be non-transitory and may include, for example, one or more volatile and/or non-volatile memories. In other words, for example, the memory 206 may be an electronic storage device (for example, a computer readable storage medium) comprising gates configured to store data (for example, bits) that may be retrievable by a machine (for example, a computing device like the processor 202). The memory 206 may be configured to store information, data, content, applications, instructions, or the like, for enabling the system 102 to carry out various functions in accordance with an example embodiment of the present disclosure. For example, the memory 206 may be configured to buffer input data for processing by the processor 202. As exemplified in FIG. 2, the memory 206 may be configured to store instructions for execution by the processor 202. As such, whether configured by hardware or software methods, or by a combination thereof, the processor 202 may represent an entity (for example, physically embodied in circuitry) capable of performing operations according to an embodiment of the present disclosure while configured accordingly. Thus, for example, when the processor 202 may be embodied as an Application Specific Integrated Circuit (ASIC), Field Programmable Gate Array (FPGA), or the like, the processor 202 may be specifically configured hardware for performing the operations described herein.

The memory 206 of the system 102 may be configured to store the payload data 204A. The payload data 204A may include the header containing updated version information, at least one table identifier associated with the update data, and the identifier data 204C and the body containing the encoded update data 204B. The updated version information may be associated with the one-way incremental counter. The table identifier may provide information about which table is updated in the first database 106A, i.e., a table in which the update data 204B is stored in the first database 106A. For example, the table identifier may indicate which row to be updated in which table of the first database 106A associated with the first user device 104A. Further, the identifier data 204C may correspond to, for example, the first user device 104A at which the payload data 204A is generated, the first database 106A for which the payload data 204A is transmitted, or the user 112 associated with the first user device 104A on which the update data 204B is input. In an embodiment, the payload data 204A may be generated upon receiving the update data 204B at the first user device 104A for database synchronization with the identifier data 204C used for encoding the update data 204B in the payload data 204A and/or generating header for transfer of the payload data 204A.

The update data 204B may be the data received by the input module 202A. The update data 204B may be the change in data in the first database 106A local to the first user device 104A. Further, the update data 204B may be utilized for tracking changes made during the updating of the first database 106A.

In some example embodiments, the I/O interface 206 may communicate with the system 102 and display the input and/or output of the system 102. As such, the I/O interface 206 may include a display and, in some embodiments, may also include a keyboard, a mouse, a touch screen, touch areas, soft keys, or other input/output mechanisms. In one embodiment, the system 102 may include a user interface circuitry configured to control at least some functions of one or more I/O interface 206 elements such as a display and, in some embodiments, a plurality of speakers, a ringer, one or more microphones and/or the like. The processor 202 and/or the I/O interface 206 circuitry including the processor 202 may be configured to control one or more functions of one or more I/O interface 206 elements through computer program instructions (for example, software and/or firmware) stored on the memory 206 accessible to the processor 202.

The communication interface 208 may include the input interface and output interface for supporting communications to and from the system 102 or any other component with which the system 102 may communicate. The communication interface 208 may be any means such as a device or circuitry embodied in either hardware or a combination of hardware and software that may be configured to receive and/or transmit data to/from a communications device in communication with the system 102. In this regard, the communication interface 208 may include, for example, an antenna (or multiple antennae) and supporting hardware and/or software for enabling communications with a wireless communication network 110. Additionally, or alternatively, the communication interface 208 may include the circuitry for interacting with the antenna(s) to cause transmission of signals via the antenna(s) or to handle receipt of signals received via the antenna(s). In some environments, the communication interface 208 may alternatively or additionally support wired communication. As such, for example, the communication interface 208 may include a communication modem and/or other hardware and/or software for supporting communication via cable, digital subscriber line (DSL), universal serial bus (USB), or other mechanisms.

FIG. 3 illustrates an exemplary block diagram 300 for performing a versioning mechanism, in accordance with an embodiment of the present disclosure. FIG. 3 is explained in conjunction with elements of FIG. 1A, FIG. 1B, and FIG. 2.

Existing synchronization methods use date-time changing tracking mechanism, which is not optimal, because date-time tracking mechanisms rely on a clock of a device in which an application is running. This means that the accuracy and reliability of the change tracking depend heavily on the correct configuration of date and time by the clock. For instance, if the clock is incorrectly set (e.g., due to time zone differences, manual errors, or daylight-saving changes), it can lead to inconsistencies in the recorded timestamps. This can result in data conflicts when multiple changes occur simultaneously across different devices.

The present disclosure utilizes versioning mechanism for tracking and synchronizing changes in the database(s) local to the each of the one or more local devices. The versioning mechanism may utilize a monotonic counter for tracking a change, i.e., the update data 204B, at the first user device 104A and synchronizing the changes across other local databases of other local device(s) associated with the user 112 and available to the first user device 104A as well as a database of the remote database server 108.

At 302, update data 204B is received. The update data 204B may correspond to a change in a current version of data of the first database 106A at the first user device 104A. In an exemplary embodiment, the first database 106A is a relational database stored locally on the first user device 104A. In an example, the first user device 104A may be, for example, but not limited to a mobile device, a laptop, an IoT device, and a desktop.

In an embodiment, the processor 202 may be configured to receive the update data 204B from a user interface associated with the first user device 104A. The user interface may be an interface through which the user interacts with the first database 106A. The user interface may include visual elements, controls, and commands that facilitate this interaction. In an example, the user interface may be, for example, but not limited to a graphical user interface, a command line interface, and a mobile device interface. The processor 202 may receive through the user interface the update data 204B reflecting the changes in the first database 106A of the first user device 104A.

At 304, a first instance of the first database 106A is generated. In an embodiment, the processor 202 of the system 102 may be configured to generate the first instance of the first database 106A based on the update data 204B. In an exemplary embodiment, the instance of the first database 106A be a specific, operational copy of the first database 106A that includes all the data at a particular point in time. The instance represents the current state of the first database 106A, including all the data stored in it at a given moment along with the update data 204B. In an example, in a customer database, the instance includes all the customer records, their details, and any transactions at that specific time that may have been modified based on a new customer added as part of the update data 204B.

In an embodiment, the first instance of the first database 106A may include the received update data 204B from the user interface of the first user device 104A. Further, the first instance may be utilized to generate the payload data 204A. Further, the payload data 204A may include the header and the body, the header comprising the updated version information, the at least one table identifier associated with the update data, and the first identifier and the body comprising the update data 204B.

Further, the payload data 204A may be generated using the at least one table identifier. In an embodiment, the processor 202 may be configured to identify the at least one table identifier associated with the update data based on storing of the update data within the first database 106A. The at least one table identifier may provide information about which table is updated in the first database 106A.

Furthermore, the processor 202 may be configured to receive database information associated with the first database 106A. The database information may indicate information associated with the update data 204B stored within the first database 106A. Moreover, the processor 202 may be configured to identify the at least one table identifier associated with the update data based on the database information. Further, the processor 202 may be configured to selectively add contents of the at least one table identifier within the body of the payload data 204A. In an example, the processor 102 may identify a table identifier corresponding to the at least one table identifier associated with an updated table based on storing of the update data. The processor 202 selectively adds content of the table associated with the table identifier within the body of the payload data 204A.

At 306, a one-way incremental counter is updated. In an embodiment, the processor 202 may be configured to update the one-way incremental associated with the first database 106A based on the first instance of the first database 106A. The update of the one-way incremental counter corresponds to update of version information associated with the first database. The version information may contain to and from versions for the particular instance under consideration. In an example, the version information may refer to structured data that indicates the specific state or iteration of a database. The one-way incremental counter may be associated with each row of the one or more rows of the first database 106A local to the first user device 104A. In an example, the one-way incremental counter may be a monotonically increasing sequence counter used to uniquely identify and order events, changes, or versions within a system. The one-way incremental counter value may always increase with each new increment.

In an embodiment, the processor 202 or the synchronization module 202D may maintain a version tracker table to record row level version information for each of tables of the first database 106A. The version tracker table may include one or more columns. In an example, the one or more columns may include, for example, but not limited to, data value, an id, a table name, and a database id. In an exemplary embodiment, the one-way incremental counter may be updated in case of a change in any value of the version tracker table of the first database 106A. In an example the one-way incremental counter may be updated to 2 from 1 when the new instance is generated, 1 indicating previous version of the first database 106A.

At 308, a database server synchronization operation is performed. In an embodiment, the processor 202 of the system 102 may be configured to trigger a synchronization of the first database with the database at the remote database server, based on the update of the one-way incremental counter.

As the first user device 104A is operating in offline manner, therefore, the first user device 104A may transmit the update data 204B or the payload data 204A to local devices associated with the user 112. For example, the first user device 104A may transmit the payload data 204A to the second user device 104B.

In an example, the first user device 104A is operating in online mode. In this regard, the first user device 104A may directly transmit the update data 204B as part of the payload data 204A to the remote database server 108. Further, the remote database server 108 may transmit the update data 204B to other devices associated with the user 112 over the Internet. In an example, the synchronization module 202D may establish a connection between the first user device 104A and the remote database server 108. The output module 202F may transmit the generated payload data 204A to the remote database server 108 upon establishment of the connection using synchronization module 202D.

Further, the synchronization at the remote database server 108 may be performed based on the received payload data 204A from the output module 202F of the first user device 104A or an output module of the second user device 104B (when the first user device is offline). The payload data 204A may be encrypted, and header may be added to the payload data 204A to identify source, destination, etc. Further, the header may contain version information containing to and from versions for the particular instance under consideration. Based on the version information the remote database server 108 may be synchronized.

It may be noted, the above operations may not be limited to only first user device 104A and the second user device 104B. Each of the user devices 114 associated with the user 112 may utilize the above operations of the versioning mechanism. In an example, the payload data 204A for synchronizing the remote database server 108 may be transmitted from the second user device 104A, or any of the other user devices 114 associated with the user 112 based on corresponding operation mode (i.e., online mode or offline mode). Once the remote database server 108 is synchronized, the update data 204B may be transmitted to receiver's device(s).

FIG. 4 illustrates an exemplary sequence diagram 400 for synchronizing databases between local devices associated with the user and a database server, in accordance with an example embodiment of the present disclosure. FIG. 4 is explained in conjunction with FIG. 1A, FIG. 1B, FIG. 2, and FIG. 3.

In an embodiment, the first user device 104A may correspond to a local device from the one or more local devices associated with the user 112. The first user device 104A may be any device having enough computational power and storage to maintain the first database 106A local to first user device 104A. In an example, the first user device 104A may be, for example, but not limited to a mobile device, a laptop, and a desktop.

At 402, the update data 204B is received. The update data 204B is received at the first user device 104A. The versioning module 202B may be configured to track changes during the update of the first database 106A using the update data 204B and create the instance of the update data 204B as described in FIG. 3. The update data 204B may be stored within the first database 106A local to the first user device 104A.

In an example, the update data 204B may be the change in data in the relational first database 106A. The update data 204B may correspond to changed identified based on tracking of changes made during the update of the first database 106A. The update data 204B may include changes, such as insertion, update, or deletion of records in the local first database 106A.

At 404, connectivity parameters associated with one or more local networks are determined. The connectivity parameters may be associated with each of one or more local networks available to the first user device 104A. The connectivity parameters may be indicative of a manner of connection between the first user device 104A and the local devices. The connectivity parameters may also indicate a type of connection available at each of the local devices connected to or available to the first user device 104A.

At 406, the second user device 104B is identified from the one or more local devices. The second user device 104B may be identified based on the connectivity parameters. Further, the second user device 104B may be connected to the global network, i.e., online mode. The second user device 104B may be connected to the first user device 104A using the local network selected from the one or more local networks available to the first user device 104A. The one or more local networks are established between the first user device 104A and one or more local devices associated with the user 112.

In an example, the second user device 104B may be selectively identified owing to connection of the second user device 104B with the global network or the Internet. In another example, the second user device 104B may be randomly identified from the one or more local devices 114 available to the first user device 104A on identifying that the second user device 104B is associated with the same user 112 with whom the first user device 104B is associated.

At 408, the second user device 104B is authenticated. The second user device 104B may be authenticated based on the identifier data 204C. In an embodiment, the system 102 may be configured to determine first user identifier data associated with the user 112 or the first database 106A of the first user device 104A. The first user identifier data may correspond to the identifier data 204C. The first user identifier data may include at least a first user id of the user 112, and a first database id of the first database 106A. The first user id may be a unique id of the user 112 and the first database id may be a unique id of the database for identification of the user and the local databases.

In an embodiment, the system 102 may be configured to determine second user identifier data associated with the second database 106B of the second user device 104B. The second user identifier data may include a second user id of an associated user and a second database id of the second database 106B of the second user device 104B.

In an embodiment, the system 102 may be configured to authenticate the second user device 104B based on a comparison between the first user identifier data and the second user identifier data. In an example, the second user device 104B may be authenticated when the first user id of the first user device 104A matches with the second user id of the second user device 104B. Upon authentication of the second user device 104B, an initial connection with the remote database server 108 or a user device from the one or more user devices may form. In an example, the system 102 may form initial connection with the second user device 104B.

In an embodiment, the system 102 may be configured to transmit connection data to at least one of the second user device or the remote database server. In an example, the first sync agent 114A at the first user device 104A may transmit the connection data to the remote database server 108. The connection data comprises at least a first user device identifier associated with the first user device 104A, the first identifier, and user information associated with the user 112. The first user device identifier may be used for identifying the first user device 104A. The first identifier may be used to identify the first database 106A of the first user device 104B in scenarios involving multiple databases or instances. Additionally, the first identifier may correspond to the identifier data 204C. At the end, the user information associated with the client device may be used to authenticate and authorize the user 112 initiating the connection. In an example, the user information ensures that connectivity actions are performed under the correct permissions and access rights.

In an exemplary embodiment, the remote database server 108 may receive the connection data. The remote database server 108 may validate the connection data to ensure that it is complete and accurately formatted, including the device identifier, the database identifier, the first database identifier, and the user information. Subsequently, the server may perform authentication and authorization procedures using the provided user information to verify that the first user device and user 112 have the requisite permissions to access the database. Following successful validation and authentication, the server establishes a secure communication session with the first sync agent 114A. Finally, the remote database server 108 may issue a connection acknowledgement including a confirmation response to the sync agent, indicating the success of the connection setup or detailing any encountered issues, along with any additional instructions required for proceeding with the initial connection.

In an embodiment, the system 102 may be configured to receive the connection acknowledgement from the remote database server 108. The connection acknowledgement may include the conformation response. Further, the connection data may also include an encryption key. The encryption key may be shared between a local device of the one or more local devices and the remote database server 108. In an example, the encryption key may be utilized for encoding the update data 204B associated with any of the one or more local devices.

After the initial connection may be set up, the data synchronization operation may be performed. The data synchronization operation may be performed between the remote database server 108 and one or more local devices. The data synchronization may be done to handle indefinite delays in communication, known as the infinite latency.

For this, the system 102 may generate a second synchronization request. The second synchronization request may be generated by the first sync agent 114A at the first user device 104A. The second synchronization request may include temporal data necessary for connecting to the database. Further, the synchronization request may be generated by the first sync agent 114A for synchronizing the changes made in the first database 106A local to the first user device 114A to the remote database server 108. In another example, any other device associated with the user 112 may generate a synchronization request. In yet another example, any other user device associated with another user may generate the synchronization request.

Further, the second synchronization request may be transmitted to the remote database server 108. In an embodiment, the system 102 is configured to transmit the second synchronization request to the remote database server 108. The second synchronization request is transmitted by the first sync agent ca114A to the remote database server 108 via the second user device 114B. The second sync agent 114B may receive the second synchronization request from the first sync agent 114A and transmit it to the remote database server 108. The second sync agent 114B may be operating in the online mode. The second sync agent may transmit the synchronization request to the remote database server 108 through the global network.

In an embodiment, the system 102 is configured to receive acknowledgement data from the remote database server 108 via the second user device 104B in response to the transmitting of the second synchronization request. The acknowledgement data may be received by the first sync agent 114A from the remote database server 108 via the second sync agent 114B. The acknowledgement data may include last synchronization instance data between the first user device 104A and the remote database server 108. The second sync agent 114B at the second user device 10B may receive the acknowledgement data and transmit it to the first user device 104A. The last synchronization instance data may be indicative of the last version of the database updated on the remote database server 108. It may be utilized in conflict resolution associated with the one or more databases. In an example, the acknowledgement data may also include the success or failure status associated with the synchronization request.

In an example, the remote database server 108 may receive the synchronization request. The remote database server 108 may process the synchronization request and may generate the acknowledgement data. This acknowledgement confirms the successful establishment of the connection and includes details such as the session ID, status of the connection setup, and any additional configuration information required for subsequent communication.

At 410, the payload data 204A is generated based on the acknowledgement data. The payload may be generated using the update data 204B. The payload data 204A may include the header containing the updated version information, the at least one table identifier associated with the update data 204B, and the first identifier, and the body containing the update data 204B.

In an embodiment, the system 102 may be configured to generate the payload data based on the acknowledgement data. The acknowledgement data may include last synchronization instance data between the first user device and the remote database server. In an example, the last synchronization instance data may be indicative of the last version of the database updated on the server. The system 102 may generate the payload data based on the last synchronization instance data.

Further, the system 102 may be configured to encode the payload data based on the encryption key. The first sync agent 114A at the first user device 104A may utilize the encryption key to encode the payload data. In an example the encryption key may be received as an acknowledgement from the remote database server 108.

At 412, the payload data 204A is transmitted to the second user device 104B based on the authentication. The payload data 204A may be transmitted to the second user device 104B using a local network from the one or more local networks.

In an embodiment, the second user device 104B may receive the payload data 204A. The second sync agent 114B at the second user device 104B may receive the payload data 204A from the first user device 104A. The second user device 104B may be operating in the online mode. Further, the first sync agent 114A may transmit the payload data 204A to the second user device 104B through the local network selected from the one or more local networks.

At 414, the payload data 204A is transmitted to the remote database server 108. The connection between the first user device 104A and the remote database server 108 may be established using the synchronization module 202D. The output module 202F may transmit the generated payload data 204A to the remote database server 108 upon establishment of the connection.

In an example, the second sync agent 114B may receive the payload data 204A received from first sync agent 114A to the remote database server 108. The second sync agent 114B may transmit the payload data 204A to the remote database server 108 using the global network. Further, the payload data 204A may include the header and the body. The header may include the updated version information, the at least one table identifier associated with the update data 204B, and the first identifier, and wherein the body comprises the update data 204B.

Further, the remote database server 108 may receive the payload data 204A from the second user device 104B and may validate the payload data 204A. In an embodiment, the system 102 is configured to cause, the remote database server, to validate the payload data based on at least one of the encryption key, the first identifier, or the first user device identifier. In an example, the encryption key is privately held by the first user device 104A and the remote database server 108. Further, the encryption key may be shared between the first user device 114A and the remote database server 108. The remote database server 108 may validate the payload data 204A based on the encryption key, the first identifier, or the first user device identifier. In an example, the encryption key may be a critical component of cryptographic algorithms and ensures that only authorized parties can access the encoded information. The Key may vary in length and complexity, depending on the encryption standard used, for example, AES-128, AES-256. In an example, in an AES encryption, the key could be a string of 16, 24, or 32 bytes, depending on the encryption level.

At 416, database associated with the user 112 at the remote database server 108 is synchronized. In an embodiment, the system 102 is configured to cause the remote database server 108 to synchronize the database associated with the user at the remote database server 108 based on the payload data 204A. The remote database server 108 may receive the payload data 204A indicating update in the second database 106B from the second user device 104B. Further, the remote database server 108 may be synchronized based on the received data. The remote database server 108 may modify the remote database server 108 108 to reflect changes made in a synchronized second database 106B, i.e., the update data 204B. The payload data 204A may include queries, updates, or other operations intended to interact with the database, leveraging the metadata provided in the first header to ensure correct handling and integration of the data. In an example, the remote database server 108 based on the header may update the database associated with the first user device 104A. Further, the remote database server 108 may generate a synchronization acknowledgement based on the synchronization. In an example, the synchronization acknowledgement may be associated with the version information.

In an embodiment the system 102 may be configured to receive the synchronization acknowledgement. The synchronization acknowledgement is received from the remote databases server 108. The synchronization request generated based on the synchronization. In an example, the synchronization request may be indicative of success and failure of the synchronization.

In an exemplary embodiment, the second sync agent 114B may transmit a third synchronization request to receive the payload data 204A associated with the first database 204A from the remote database server 108. In an example, the one or more local devices may transmit a request to receive the payload data 204A associated with the first user device 104A for synchronization of their local databases.

FIG. 5 illustrates exemplary flowchart 500 of a method for synchronizing databases, in accordance with an example embodiment of the present disclosure. FIG. 5 is explained in conjunction with FIG. 1A, FIG. 1B, FIG. 2, FIG. 3, and FIG. 4.

At 502, connection data associated with a global network available for the first user device 104A is determined.

At 504, a determination is made to ascertain whether the first user device 104A is connected to the global network, i.e., the internet or any other wide-area network that provides global connectivity based on the connection data. The global network may include, for example, but not limited to, a wired or wireless connection to the user's ISP or mobile network.

At 506, connectivity parameters associated with each of the one or more local networks available to the first user device 104A are determined in response to determining that the global network is unavailable for the first user device 104A. In an embodiment, in response to determining that the global network is unavailable for the first user device 104A, the system 102 may check any local networks that the first user device 104A can connect to. In an exemplary embodiment, local networks may include Wi-Fi networks, Bluetooth connections, or any other nearby network options that do not require global internet access. In an example, the connectivity parameters may include network type, signal strength, network speed, latency, IP address, network capabilities.

For example, the first user device 104A may connect to one of the local devices associated with the user 112 over a local network. After connection is established, the first user device 104A may transmit the update data 204B as part of the payload data 204A to the local device, such as the second user device 104B, the third user device 204C, the fourth user device 104D, or any other local device associated with the user 112.

At 510, a database associated with the user 112 at the remote database server 108 is synchronized based on the payload data 204A.

In an example, the update data 204B may be a message. In such a case, databases of different user devices associated with the user 112 may be updated to indicate the sent message. Moreover, databases local to other user devices associated with a receiver of the message may also be updated to indicate the received message. For example, such other user devices may be associated with a user (a receiver) different from the user 112.

For example, when the first user device 104A is unable to connect to the main global network. In this case, the system 102 will start looking for alternative local network options that the first user device 104A can connect to, for example, Wi-Fi, Bluetooth connections, or any other devices. Further, the system 102 will check how strong the network signal is, download and upload speeds of the local networks, and IP address assigned to first user device 104A on that local network. By collecting these connectivity parameters for each available local network, the system 102 builds a picture of the different options that first user device 104A has for getting online or communicating with other devices, even though the main global internet is currently unavailable.

When the determination is made that the first user device 104A is connected to the global network, then at 508, the payload data 204A may be transmitted to the remote database server 108 via the global network for synchronization.

At 508, in response to determining that the global network is available for the first user device, the system 102 transmits the payload data 204A for synchronization to the remote database server 108 through the global network. In an embodiment, when the first user device 104A has internet connection, the system 102 may directly transmit the payload data 204A for synchronization to the remote database server 108. In an exemplary embodiment, when the second user device 104B has internet connection, the system 102 may directly transmit the payload data 204A, from the second user device 104B, for synchronization to the remote database server 108. In another exemplary embodiment, when the third user device 104C has internet connection, the system 102 may directly transmit the payload data 204A, from the third user device 104C, for synchronization to the remote database server 108.

In an embodiment, at 510, the system 102 may be configured to cause to synchronize the database associated with the user at the database server based on the payload data 204A. In an embodiment, the system 102 may initiate a process to update or synchronize a database stored on the remote database server 108 with payload data 204A related to the first user 112 and received from the first user device 104A. The payload contains the new information that is used to update the database.

To this end, the system 102 is configured to cause to update the one or more local databases associated with each of the one or more local devices available to the first user device 104A using the one or more local networks and/or the global network.

FIG. 6 illustrates an exemplary sequence diagram 600A for synchronizing databases between local devices, in accordance with an example embodiment of the present disclosure. FIG. 6 is explained in conjunction with FIG. 1A, FIG. 1B, FIG. 2, FIG. 3, FIG. 4, and FIG. 5.

In an embodiment, the system 102 is configured to transmit a first synchronization request to the remote database server 108. The first synchronization request is transmitted to the remote database server via the second user device. The details about the synchronization request is provided in, for example, the FIG. 4A. In an example, the synchronization request may be associated with a request for change data. In another example, the first user device 104A may request for the change data along with the updating of the database associated with the first user device 104A at the database server 108.

At 602, change data is received. In an example, the remote database server 108 may receive the change data from any device associated with the user 112. In another example, the remote database server 108 may receive the change data from any other user device associated with another user who may be a sender of the change data. For example, such change data may have to be sent to the user 112. It may be noted that the received change data may be encrypted. The change data may be transmitted to the remote database server 108 over a global network connection, for example, the Internet.

At 604, the change data is transmitted to the second user device 104B. In an embodiment, the second user device receives the change data from the remote database server 108. The second sync agent 114B at the second user device 104B may receive the change data from the remote database server 108. The second user device 104B is assumed to be connected to the global network for receiving the change data from the remote database server 108.

At 606, the change data is transmitted to the first user device 104A. In an embodiment, the system 102 may be configured to cause the second user device 104B to receive the change data from the remote database server 108 in response to the first synchronization request. In an example, the second sync agent 114B at the second user device 104 may transmit the change data to the first user device 104A. In an example, the first user device 104A may be offline. Subsequently, the change data may be transmitted to the first user device 104A over a local network, such as a Wi-Fi network between the second user device 104B and the first user device 104A.

In an embodiment, the first user device 104A allows for out-of-order reception of the change data. In particular, the out-of-order reception of the change data refers to a situation where data packets or units of the change data are received in a sequence different from an order in which they were sent, such as from the remote database server 108 and/or the second user device. This may happen as the change data is broken down into smaller packets, transmitted individually, and may take different routes to the destination, i.e., the first user device 104A. To this end, when these packets arrive, they may not necessarily arrive in the same order due to network delays, varying transmission speeds, or rerouting caused by network congestion and/or network unavailability at the first user device 104A. The first sync agent 114 may then reorder the data to reconstruct the change data correctly.

To this end, the change data is received by the first user device 104A. In an embodiment the system 102 may be configured to receive the change data from the second user device, the second user device receives the change data from the remote database server 108 in response to the first synchronization request. In an example, the first user device 104A may be offline. The first user device 104A may receive the change data over the local network.

In an embodiment, the remote database server 108 allows for unlimited round-trip delay in reception of synchronization request(s) and/or completion of an entire synchronization process. In this regard, the remote database server 108 allows unlimited round-trip delay in executing the synchronization process of synchronizing the first database at the first user device 104A. Subsequently, the remote database server 108 may allow unlimited delay in receiving acknowledgement of the synchronization of the first database at the first user device 104A. The remote database server 108 also allows for out-of-order reception of the synchronization requests.

At 608, the first database 106A is synchronized. The first sync agent 114A may synchronize the first database 106A based on the received change data. In an example, the first sync agent 114A may receive the change data, validate the change data, and update the first database 106A may be updated based on the change data.

FIG. 7 illustrates an exemplary flowchart 700 of a method for database synchronization, in accordance with the present disclosure. FIG. 7 is explained in conjunction with FIG. 1A, FIG. 1B, FIG. 2, FIG. 3, FIG. 4, FIG. 5, FIG. 6A, and FIG. 6B. The operations of the exemplary method may be executed by any computing system of FIG. 1 or the processor 202 of FIG. 2. The operations of the flowchart 700 may start at 702.

At 702, the update data 204B associated with the user 112 is received on the first user device 104A. In an embodiment, the system 102 may be configured to receive the update data 204B on the first user device 104A associated with the user 112. The first user device 104A may be operating in an offline mode. The update data 204B may be stored within the first database 106A local to the first user device 104A. The update data 204B may include a new record inserted to the local relational first database 106A, a modification in an existing record in the first database 106A, and/or a deletion in the first database 106A.

At 704, connectivity parameters associated with each of one or more local networks available to the first user device 104A are determined. In an embodiment, the system 102 may be configured to determine the connectivity parameters associated with each of one or more local networks available to the first user device 104A. The one or more local networks are established between the first user device 104A and one or more local devices 114 associated with the user 112. The one or more local devices 114 may include smartphone, laptop, tablet, and personal computers.

At 706, the second user device 104B from the one or more local devices available to the first user device 104A is identified. In an embodiment, the system 102 may be configured to identify the second user device 104B from the one or more local devices 114 available to the first user device 104A based on the connectivity parameters. The second user device 104B may be operating in an online mode.

At 708, payload data 204A for communication with the second user device 104B is generated. In an embodiment, the system 102 may be configured to generate the payload data 204A for communication with the second user device 104B. Further, the payload data 204A may include the update data 204B which is encoded based on at least a first identifier associated with the first database 106A.

At 710, the payload data 204A is transmitted to the second user device 104B. In an embodiment, the system 102 may be further configured to transmit the payload data 204A to the second user device 104B based on a local network from the one or more local networks.

At 712, the payload data 204A is transmitted to the remote database server 108. In an embodiment, the system 102 may be further configured to cause the second user device 104B to transmit the payload data 204A to the remote database server 108. The payload data 204A may include the update data 204B.

At 714, a database associated with the user 112 is synchronized at the remote database server 108. In an embodiment, the system 102 may be further configured to cause the remote database server 108 to synchronize the database associated with the user 112 at the remote database server 108 based on the payload data 204A.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of reactants and/or functions, it should be appreciated that different combinations of reactants and/or functions may be provided by alternative embodiments without departing from the scope of the appended claims. In this regard, for example, different combinations of reactants and/or functions than those explicitly described above are also contemplated as may be set forth in some of the appended claims. Although specific terms are employed herein, they are used in a generic and descriptive sense only and not for purposes of limitation.

What is claimed is:

1. A system for database synchronization, the system comprising:

a memory configured to store computer executable instructions; and one or more processors configured to execute the computer executable instructions to:

receive, on a first user device associated with a user, update data, wherein the update data is stored within a first database local to the first user device, and wherein the first user device operates in an offline mode;

determine connectivity parameters associated with each of one or more local networks available to the first user device, wherein the one or more local networks are established between the first user device and one or more local devices associated with the user;

identify a second user device from the one or more local devices available to the first user device based on the connectivity parameters, wherein the second user device is operating in an online mode;

generate payload data for communication with the second user device, the payload data comprising the update data encoded based on at least a first identifier associated with the first database;

transmit the payload data to the second user device based on a local network from the one or more local networks, wherein the local network is associated with the second user device;

cause the second user device to transmit the payload data to a remote database server; and cause the remote database server, to synchronize a database associated with the user at the remote database server based on the payload data.

2. The system of claim 1, wherein the one or more processors are further configured to:

receive the update data from a user interface associated with the first user device;

generate a first instance of the first database based on the update data;

update a incremental counter associated with the first database based on the first instance of the first database, wherein the update of the incremental counter corresponds to an update of version information associated with the first database; and trigger a synchronization of the first database with the database at the remote database server based on the update of the incremental counter.

3. The system of claim 1, wherein the payload data comprises a header and a body, and wherein the header comprises at least: updated version information, at least one table identifier associated with the update data, and the first identifier, and wherein the body comprises the update data.

4. The system of claim 3, wherein the one or more processors are further configured to:

receive database information associated with the first database, the database information indicating information associated with the update data stored within the first database;

identify the at least one table identifier associated with the update data based on the database information; and selectively add contents of the at least one table identifier within the body based on the database information and the identification of the at least one table identifier.

5. The system of claim 1, wherein the one or more processors are further configured to:

transmit connection data to at least one of: the second user device or the remote database server, wherein the connection data comprises at least a first user device identifier associated with the first user device, the first identifier, and user information associated with the user;

receive connection acknowledgement from the remote database server in response to the transmitting of the connection data, wherein the connection acknowledgement comprises an encryption key; and encode the payload data based on the encryption key.

6. The system of claim 5, wherein the one or more processors are further configured to:

cause the remote database server to validate the payload data based on at least one of: the encryption key, the first identifier, or the first user device identifier, wherein the encryption key is privately held by the first user device and the remote database server;

cause the remote database server to synchronize the database associated with the user at the remote database server based on the payload data; and receive a synchronization acknowledgement from the remote database server based on the synchronization of the database associated with the user at the remote database server.

7. The system of claim 1, wherein the one or more processors are further configured to:

determine first user identifier data associated with the first user device;

determine second user identifier data associated with the second user device;

authenticate the second user device based on the first user identifier data and the second user identifier data; and transmit the payload data to the second user device based on the authentication of the second user device.

8. The system of claim 1, wherein the one or more processors are further configured to:

transmit a first synchronization request to the remote database server, wherein the first synchronization request is transmitted to the remote database server via the second user device; and receive change data from the second user device, wherein the second user device receives the change data from the remote database server in response to the first synchronization request.

9. The system of claim 8, wherein the first user device allows for out-of-order reception of the change data.

10. The system of claim 1, wherein the one or more processors are further configured to:

transmit a second synchronization request to the remote database server, wherein the second synchronization request is transmitted to the remote database server via the second user device;

receive acknowledgement data from the remote database server via the second user device in response to the transmitting of the second synchronization request, wherein the acknowledgement data comprises last synchronization instance data; and generate the payload data based on the acknowledgement data.

11. The system of claim 1, wherein the one or more processors are further configured to:

determine connection data associated with a global network available for the first user device; and in response to determining unavailability of the global network for the first user device, determine the connectivity parameters associated with each of the one or more local networks available to the first user device.

12. The system of claim 11, wherein the one or more processors are further configured to:

in response to determining availability of the global network for the first user device, transmit the payload data for synchronization to the remote database server through the global network; and cause the remote database server to synchronize the database associated with the user at the remote database server based on the payload data.

13. The system of claim 1, wherein the second user device is associated with a second database, wherein each of the first database and the second database is a relational database, and wherein the remote database server is a relational database server.

14. A method for database synchronization, the method comprising:

receiving, on a first user device associated with a user, update data, wherein the update data is stored within a first database local to the first user device, and wherein the first user device operates in an offline mode;

determining connectivity parameters associated with each of one or more local networks available to the first user device, wherein the one or more local networks are established between the first user device and one or more local devices associated with the user;

identifying a second user device from the one or more local devices available to the first user device based on the connectivity parameters, wherein the second user device is operating in an online mode;

generating payload data for communication with the second user device, the payload data comprising the update data encoded based on at least a first identifier associated with the first database;

transmitting the payload data to the second user device based on a local network from the one or more local networks, wherein the local network is associated with the second user device;

causing the second user device to transmit the payload data to a remote database server; and causing the remote database server to synchronize a database associated with the user at the remote database server based on the payload data.

15. The method of claim 14, further comprising:

receiving the update data from a user interface associated with the first user device;

generating a first instance of the first database based on the update data;

updating a incremental counter associated with the first database based on the first instance of the first database, wherein the update of the incremental counter corresponds to update of version information associated with the first database; and triggering a synchronization of the first database with the database at the remote database server based on the update of the incremental counter.

16. The method of claim 14, further comprising:

receiving database information associated with the first database, the database information indicating information associated with the update data stored within the first database;

identifying at least one table identifier associated with the update data based on the database information; and selectively adding contents of the at least one table identifier within a body of the payload data based on the database information and the identification of the at least one table identifier.

17. The method of claim 14, further comprising:

determining first user identifier data associated with the first user device;

determining second user identifier data associated with the second user device;

authenticating the second user device based on the first user identifier data and the second user identifier data; and transmitting the payload data to the second user device based on the authentication of the second user device.

18. The method of claim 14, further comprising:

transmitting a first synchronization request to the remote database server, wherein the first synchronization request is transmitted to the remote database server via the second user device; and receiving change data from the second user device, wherein the second user device receives the change data from the remote database server in response to the first synchronization request.

19. The method of claim 14, further comprising:

transmitting a second synchronization request to the remote database server, wherein the second synchronization request is transmitted to the remote database server via the second user device;

receiving acknowledgement data from the remote database server via the second user device in response to the transmitting of the second synchronization request, wherein the acknowledgement data comprises last synchronization instance data; and generating the payload data based on the acknowledgement data.

20. A computer programmable product comprising a non-transitory computer readable medium having stored thereon computer executable instructions for database synchronization, which when executed by one or more processors, cause the one or more processors to carry out operations comprising:

receiving, on a first user device associated with a user, update data, wherein the update data is stored within a first database local to the first user device, and wherein the first user device operates in an offline mode;

determining connectivity parameters associated with each of one or more local networks available to the first user device, wherein the one or more local networks are established between the first user device and one or more local devices associated with the user;

identifying a second user device from the one or more local devices available to the first user device based on the connectivity parameters, wherein the second user device is operating in an online mode;

generating payload data for communication with the second user device, the payload data comprising the update data encoded based on at least a first identifier associated with the first database;

transmitting the payload data to the second user device based on a local network from the one or more local networks, wherein the local network is associated with the second user device;

causing the second user device to transmit the payload data to a remote database server; and causing the remote database server to synchronize a database associated with the user at the remote database server based on the payload data.

\* \* \* \* \*